United States Patent
Yu et al.

(10) Patent No.: US 9,077,843 B2
(45) Date of Patent: Jul. 7, 2015

(54) VIDEO PLAYBACK SYSTEM AND RELATED COMPUTER PROGRAM PRODUCT FOR JOINTLY DISPLAYING VIDEO WITH MULTIPLE SCREENS

(71) Applicant: Realtek Semiconductor Corp., Hsinchu (TW)

(72) Inventors: Siu-Leong Yu, Hsinchu County (TW); Shih-Chun Wei, Hsinchu (TW); Chen Ma, San Jose, CA (US)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 191 days.

(21) Appl. No.: 13/858,546

(22) Filed: Apr. 8, 2013

(65) Prior Publication Data

US 2013/0265487 A1     Oct. 10, 2013

Related U.S. Application Data

(60) Provisional application No. 61/620,988, filed on Apr. 6, 2012, provisional application No. 61/727,745, filed on Nov. 18, 2012.

(51) Int. Cl.
*G09G 5/00* (2006.01)
*H04N 9/12* (2006.01)
*G06F 3/14* (2006.01)
*G02F 1/1333* (2006.01)

(52) U.S. Cl.
CPC .............. *H04N 9/12* (2013.01); *G02F 1/13336* (2013.01); *G06F 3/1446* (2013.01); *G06F 3/1454* (2013.01); *G09G 2356/00* (2013.01); *G09G 2370/042* (2013.01)

(58) Field of Classification Search
USPC .......................................................... 345/1.3
See application file for complete search history.

(56) References Cited

U.S. PATENT DOCUMENTS

| 2003/0017823 A1* | 1/2003 | Mager et al. | 455/414 |
| 2012/0062475 A1* | 3/2012 | Locker et al. | 345/173 |
| 2013/0169510 A1* | 7/2013 | Tahara et al. | 345/1.3 |

* cited by examiner

*Primary Examiner* — Charles V Hicks
(74) *Attorney, Agent, or Firm* — Birch, Stewart, Kolasch & Birch, LLP

(57) ABSTRACT

A video playback system for jointly displaying video with multiple screens, includes multiple portable communication devices each comprises at least one screen; a location detection circuit for dynamically detecting respective portable communication device's spatial location and orientation; and a multi-screen display controlling server for dynamically generate multiple partitioned videos respectively corresponding to multiple non-overlap image areas of a target video according to detection results of the location detection circuit. The multi-screen display controlling server respectively transmits the multiple partitioned videos to the multiple portable communication devices. The multi-screen display controlling server controls the multiple portable communication devices to respectively display the multiple partitioned videos on the multiple screens to jointly display at least a portion of a visible area of the target video.

16 Claims, 14 Drawing Sheets

VIDEO PLAYBACK SYSTEM AND RELATED COMPUTER PROGRAM PRODUCT FOR JOINTLY DISPLAYING VIDEO WITH MULTIPLE SCREENS

CROSS-REFERENCE TO RELATED APPLICATIONS

This application claims the benefit of priority to U.S. Provisional Application Ser. No. 61/620,988, filed on Apr. 6, 2012; the entirety of which is incorporated herein by reference for all purposes.

This application claims the benefit of priority to U.S. Provisional Application Ser. No. 61/727,745, filed on Nov. 18, 2012; the entirety of which is incorporated herein by reference for all purposes.

This application claims the benefit of priority to Patent Application No. 102112249, filed in Taiwan on Apr. 3, 2013; the entirety of which is incorporated herein by reference for all purposes.

BACKGROUND

The disclosure generally relates to a video playback system and, more particularly, to the video playback system for jointly displaying video with multiple screens and related computer program product.

As technology progresses, portable communication devices capable of connecting to a network and displaying videos, such as smart phones, tablet computers, or handheld game consoles, have become more and more popular. In consideration of the portability and convenience in use, a screen arranged on a portable communication device is typically very limited in size, and is thus unable to provide a larger displaying area.

In related art, multiple screens may be pre-connected to a computer host through connection wires to form a video-wall capable of jointly displaying the same video with multiple screens. Video signals to be displayed on the traditional video wall system have to be customized in advance under given number and arrangement of the screens, and stored in the computer host. Accordingly, the number, the size, and the placement of the screens used in the video-wall system have to be strictly arranged based on the format of video signals stored in the computer host, and are not allowed to be flexibly adjusted.

However, different portable communication devices may be provided with screens of different sizes, and may be installed with different operating systems. If multiple portable communication devices are employed to joint display the same video by adopting the structure of the traditional video-wall system, then the number of the portable communication devices, the size of the screen arranged on each portable communication device, the operating system installed in each portable communication device, and the placement of the portable communication devices should be restricted to a fixed pattern, and not allow the user to flexibly change the combination of the portable communication devices for jointly displaying the same video based on his/her preference. Apparently, such restriction severely reduces the convenience and flexibility in use, and is therefore not an ideal solution.

SUMMARY

An example embodiment of a video playback system for jointly displaying video with multiple screens is disclosed, comprising: multiple portable communication devices each comprising at least one of the multiple screens, wherein the multiple portable communication devices comprise a first portable communication device having a first screen, and the first screen is one of the multiple screens; a location detection circuit, configured to dynamically detect a spatial location and an orientation for each of the multiple portable communication devices; and a multi-screen display controlling server, configured to operably establish a device group relationship among the multiple portable communication devices, to dynamically generate multiple partitioned videos respectively corresponding to multiple non-overlap image areas of a target video according to detection results of the location detection circuit, and to respectively transmit the multiple partitioned videos to the multiple portable communication devices; wherein a relative position among the multiple image areas matches with a relative position among the multiple portable communication devices; wherein the multi-screen display controlling server controls the multiple portable communication devices to respectively display the multiple partitioned videos on the multiple screens to jointly display at least a portion of a visible area of the target video; wherein when a location or orientation of the first portable communication device changes, the multi-screen display controlling server dynamically generates an adjusted partitioned video according to a new location or orientation of the first portable communication device, and controls the first portable communication device to display the adjusted partitioned video on the first screen.

An example embodiment of a computer program product is disclosed. The computer program product is stored in a non-transitory storage device of a multi-screen display controlling server for jointly displaying video with multiple screens. When the computer program product is executed by a control circuit of the multi-screen display controlling server, the computer program product enables the multi-screen display controlling server to perform a multi-screen display controlling operation. The computer program product comprises: a group setting module, configured to operably establish a device group relationship among multiple portable communication devices each comprising at least one of the multiple screens, wherein the multiple portable communication devices comprise a first portable communication device having a first screen, and the first screen is one of the multiple screens; a receiving module, configured to dynamically receive detection results of a location detection circuit with respect to a spatial location and an orientation for each of the multiple portable communication devices; a partitioned video providing module, configured to dynamically generate multiple partitioned videos respectively corresponding to multiple non-overlap image areas of a target video according to detection results of the location detection circuit, and to respectively transmit the multiple partitioned videos to the multiple portable communication devices; wherein a relative position among the multiple image areas matches with a relative position among the multiple portable communication devices; and a displaying control module, configured to operably control the multiple portable communication devices to respectively display the multiple partitioned videos on the multiple screens to jointly display at least a portion of a visible area of the target video; wherein when a location or orientation of the first portable communication device changes, the partitioned video providing module dynamically generates an adjusted partitioned video according to a new location or orientation of the first portable communication device, and the displaying control module controls the first portable communication device to display the adjusted partitioned video on the first screen.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
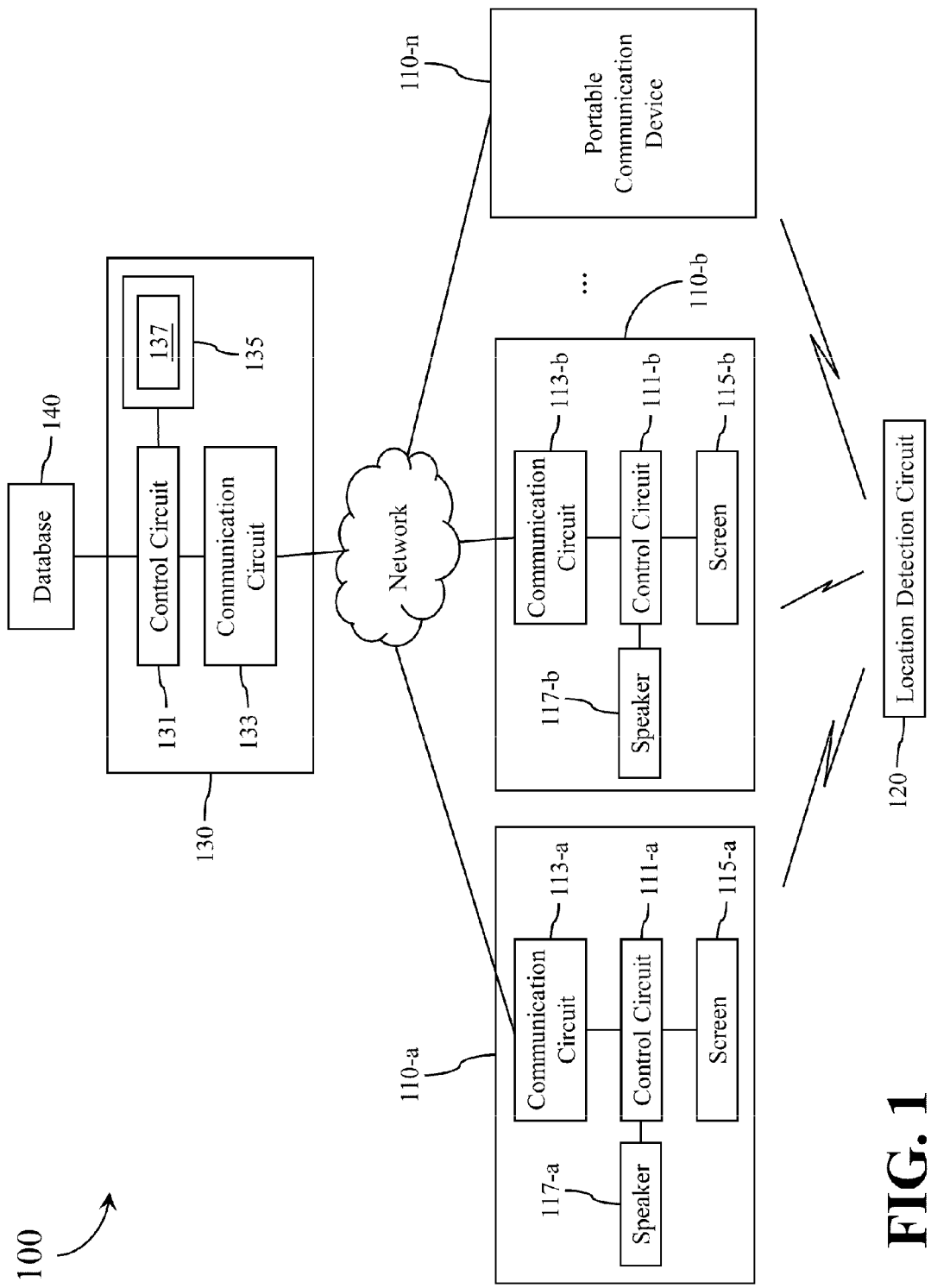
FIG. 1 shows a simplified functional block diagram of a multi-screen video playback system according to one embodiment of the present disclosure.

FIG. 1 shows a simplified functional block diagram of a multi-screen video playback system 100 according to one embodiment of the present disclosure. The multi-screen video playback system 100 comprises multiple portable communication devices 110, such as the portable communication devices 110-a~110-n shown in FIG. 1. In addition, the multi-screen video playback system 100 further comprises a location detection circuit 120, a multi-screen display controlling server 130, and a database 140. The multi-screen video playback system 100 utilizes the portable communication devices 110-a~110-n to display videos. The target video to be watched by users of the portable communication devices 110-a~110-n is stored in the database 140 and accessible by the multi-screen display controlling server 130. In practice, the database 140 may be realized with a single database, or may be realized with a combination of multiple databases located in the same geographical area or located in different geographical areas.

In the multi-screen video playback system 100, the location detection circuit 120 is configured to dynamically detect a spatial location and an orientation for each of the portable communication devices 110-a~110-n. The multi-screen display controlling server 130 is configured to operably establish a device group relationship among the portable communication devices 110-a~110-n, and to define multiple non-overlap image areas in a visible area of the target video according to the detection results of the location detection circuit 120, so that a relative position among the multiple image areas matches with a relative position among the portable communication devices 110-a~110-n. Then, the multi-screen display controlling server 130 dynamically generates multiple partitioned videos respectively corresponding to the aforementioned multiple non-overlap image areas, and respectively transmits the multiple partitioned videos to the portable communication devices 110-a~110-n. The multi-screen display controlling server 130 controls the portable communication devices 110-a~110-n to respectively display the multiple partitioned videos to jointly display at least a portion of a visible area of the target video.

The term "visible area of the target video" as used throughout the description and the claims is intended to refer to the overall image scope of the target video that is theoretically displayable at any given point of time, and not intended to refer to the aggregation of the images that are actually displayed on the portable communication devices 110-a~110-n at any given point of time. Accordingly, a total area of the visible area of the target video may be greater than or equal to a total area of the images that are actually displayed on the portable communication devices 110-a~110-n at any given point of time, or may be less than the total area of the images that are actually displayed on the portable communication devices 110-a~110-n at any given point of time.

In addition, the term "partitioned video" as used throughout the description and the claims is intended to refer to a video formed by images of a specific image area within the visible area of the target video.

In other words, when the portable communication devices 110-a~110-n respectively display the multiple partitioned videos generated by the multi-screen display controlling server 130, each portable communication device 110 only displays the images of a specific image area of the target video.

Throughout the specification and drawings, indexes a~n may be used in the reference numbers of components and devices for ease of referring to respective components and devices. The use of indexes a~n does not intend to restrict the amount of components and devices to any specific number. In the specification and drawings, if a reference number of a particular component or device is used without having the index, it means that the reference number is used to refer to any unspecific component or device of corresponding component group or device group. For example, the reference number 111-a is used to refer to the specific control circuit 111-a, and the reference number 111 is used to refer to any unspecific control circuit of the control circuits 111-a~111-n. In another example, the reference number 110-a is used to refer to the specific the portable communication device 110-a, and the reference number 110 is used to refer to any unspecific portable communication device of the portable communication devices 110-a~110-n.

As shown in FIG. 1, the portable communication device 110 comprises a control circuit 111, a communication circuit 113, a screen 115, and a speaker 117. The multi-screen display controlling server 130 comprises a control circuit 131, a communication circuit 133, and a non-transitory storage device 135, wherein the storage device 135 is stored with a computer program product 137. Each of the control circuits 111 and 131 may be realized with one or more processor units. Each of the communication circuits 113 and 133 may be realized with a wired networking circuit, a wireless networking circuit, or a hybrid circuit integrated with the functionalities of the above wired networking circuit and the wireless networking circuit. In practice, the multi-screen display controlling server 130 may be realized with a single server, or may be realized with a combination of multiple servers located in the same area or located in different geographical areas. In operations, the multi-screen display controlling server 130 may communicate data with the portable communication devices 110-a~110-n via a network. The aforementioned network may be the internet or an intranet adopting various communication protocols.

In the multi-screen video playback system 100, the portable communication devices 110-a~110-n are not restricted to have the same hardware specification and to use the same operating system. In addition, the screens 115-a~115-n of the portable communication devices 110-a~110-n are not restricted to have the same size. In practical applications, each of the portable communication devices 110-a~110-n may be realized with any portable electronic device having a screen and capable of connecting to a network. For example, the portable communication device 110 may be a mobile phone, a tablet computer, an electronic book, or a handheld game console.

In practice, the location detection circuit 120 may be realized with various existing object positioning circuits, such as one or more magnetic sensor circuits, ultrasonic positioning circuits, infrared sensing circuits, image sensing and identifying circuits, Wi-Fi signal positioning circuits, motion detecting circuits, indoor GPS circuits, posture sensing circuits, or the like. In the applications where the portable communication devices 110-a~110-n are placed on the same horizontal plane, the location detection circuit 120 may be positioned above all of the portable communication devices 110-a~110-n, such as be positioned at a ceiling, so that a position of the location detection circuit 120 is higher than positions of all the portable communication devices 110-a~110-n in order to enhance the location detecting accuracy. In the applications where the portable communication devices 110-a~110-n are placed on the same vertical plane, the location detection circuit 120 may be positioned right in front of all of the portable communication devices 110-a~110-n in order to enhance the location detecting accuracy.

Figure 2:
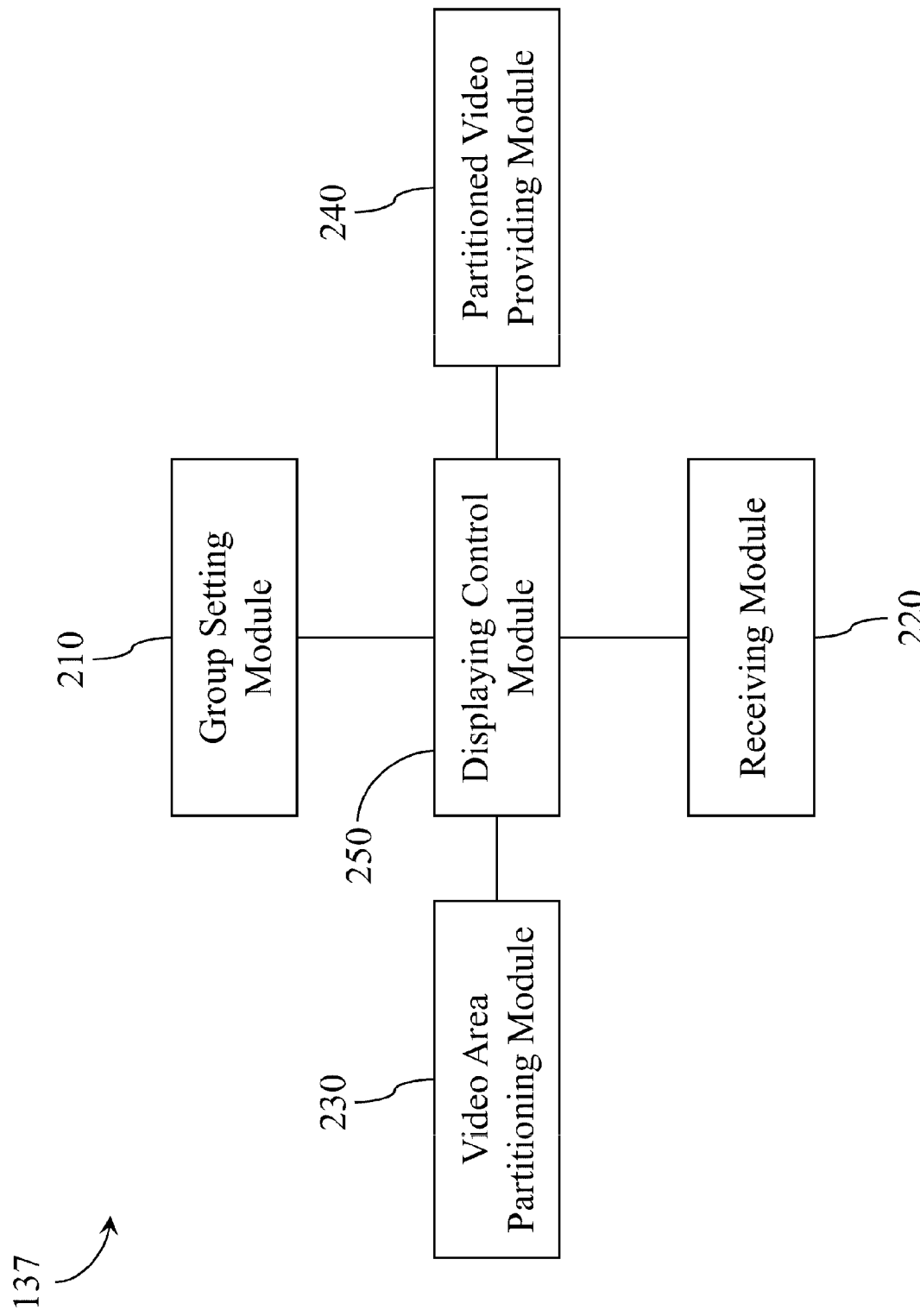
FIG. 2 shows a simplified schematic diagram of functional modules of a computer program product stored in the multi-screen display controlling server in FIG. 1 according to one embodiment of the present disclosure.

The aforementioned computer program product 137 stored in the multi-screen display controlling server 130 may be realized with one or more application program modules. For example, FIG. 2 shows a simplified schematic diagram of functional modules of the computer program product 137 in FIG. 1 according to one embodiment of the present disclosure. In this embodiment, the computer program product 137 comprises a group setting module 210, a receiving module 220, a video area partitioning module 230, a partitioned video providing module 240, and a displaying control module 250.

The operations of the multi-screen video playback system 100 will be further described in the following with reference to FIG. 3 through FIG. 7.

Figure 3:
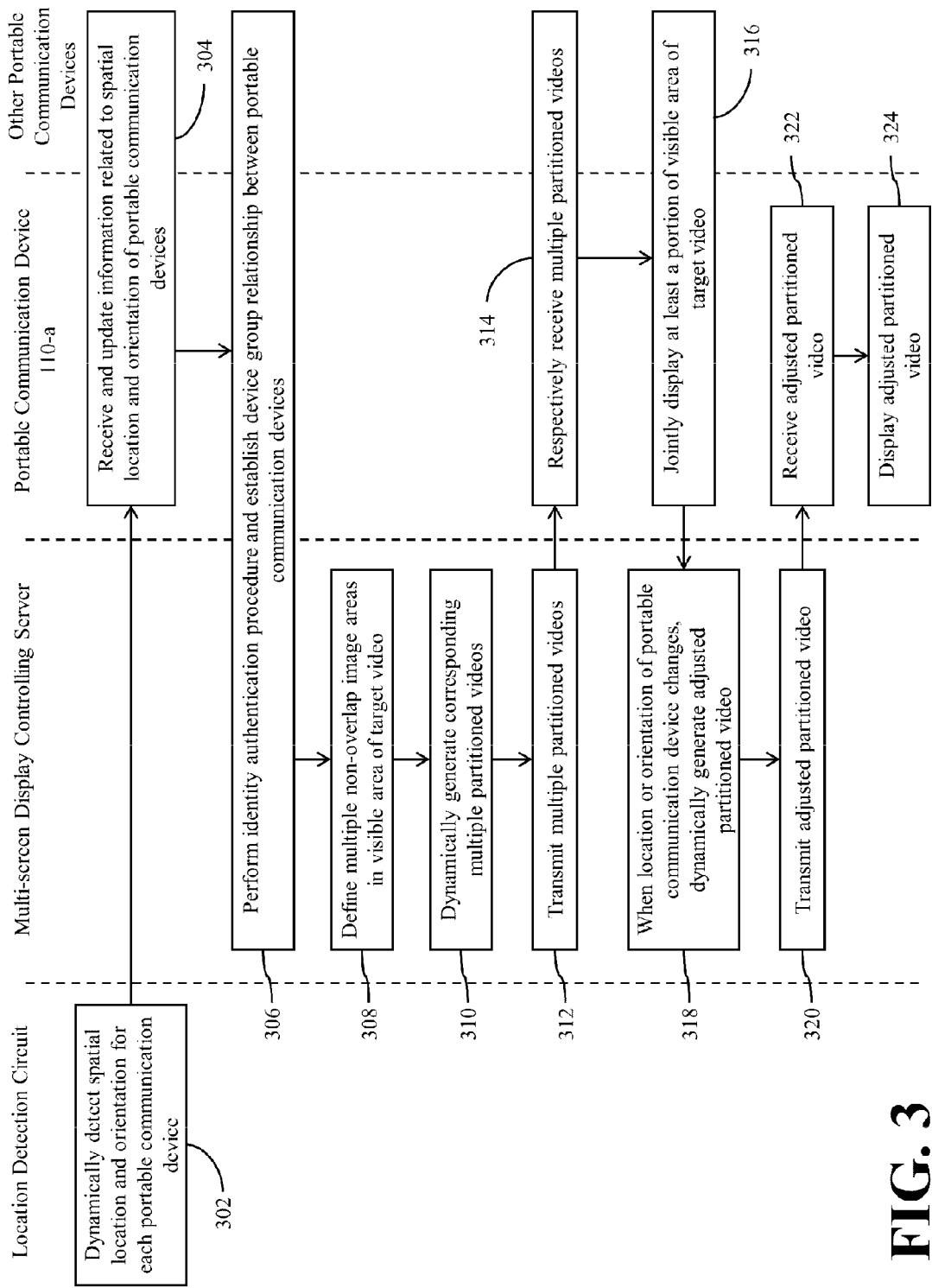
FIG. 3 shows a simplified flowchart illustrating a video playback method according to one embodiment of the present disclosure.
Figure 4:
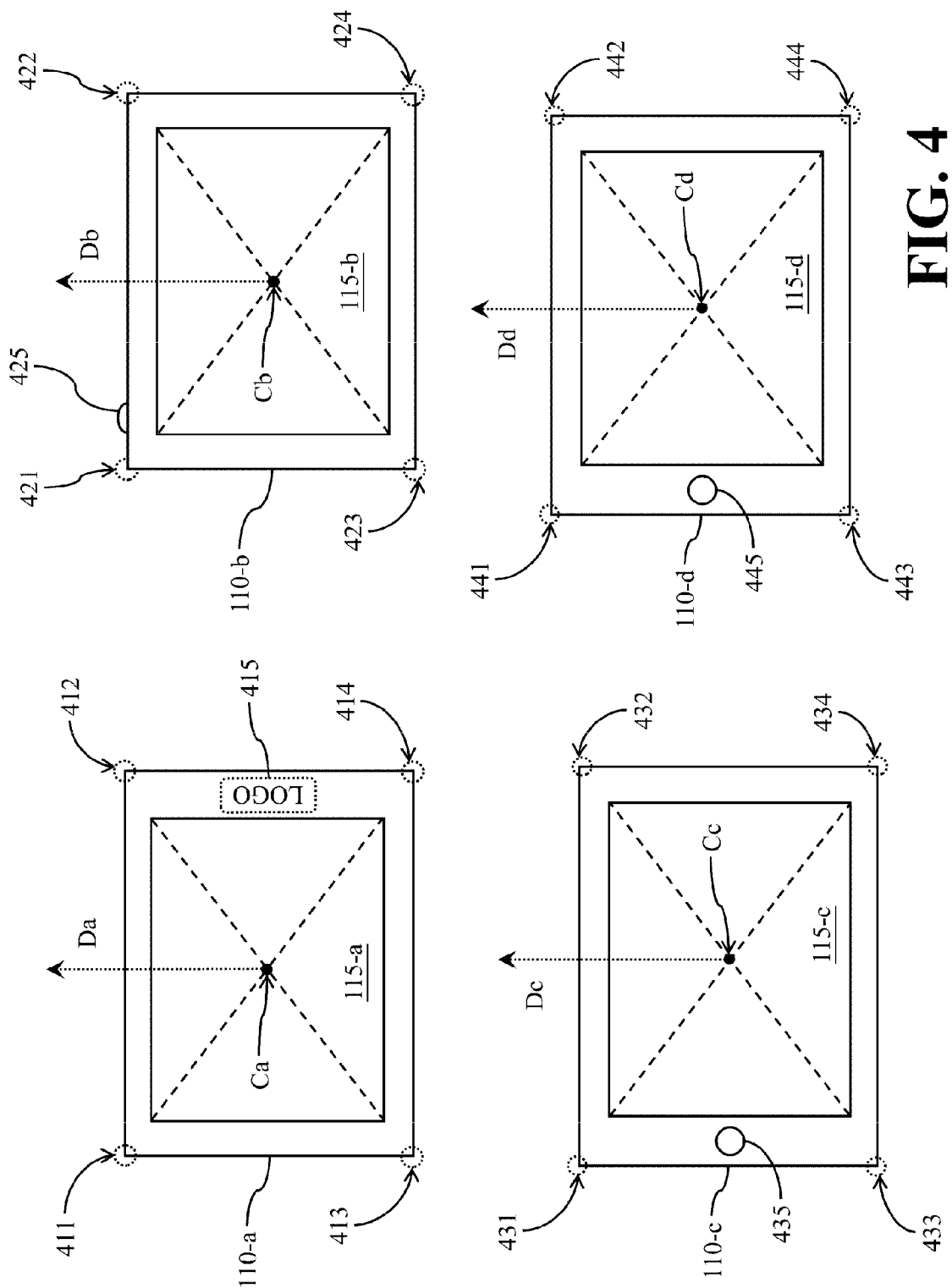
FIG. 4 shows a simplified schematic diagram of spatial locations for partial portable communication devices in FIG. 1 according to one embodiment of the present disclosure.
Figure 5:
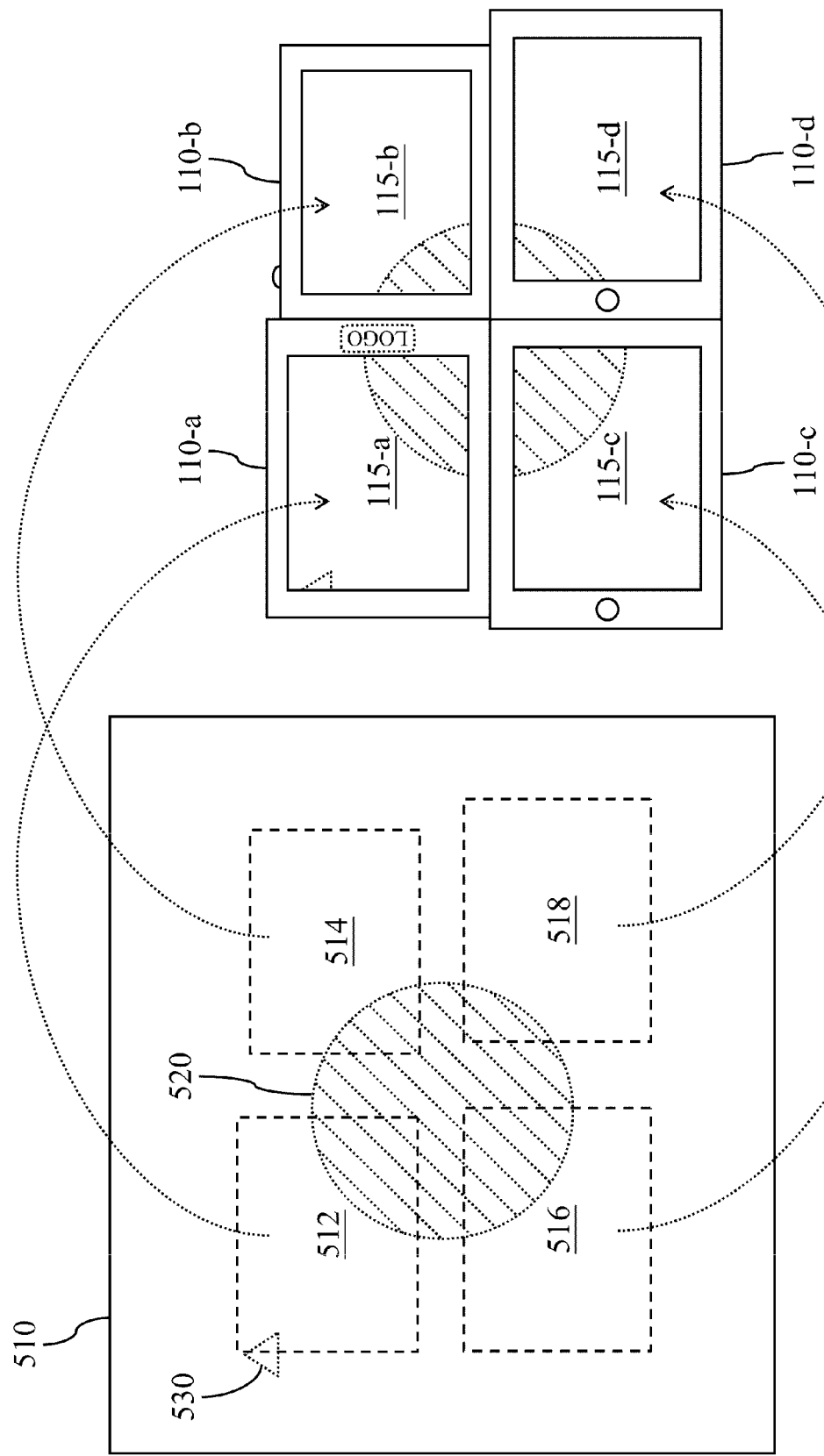
FIG. 5 through FIG. 7 show simplified schematic diagrams illustrating mapping relationship between a visible area of a target video and multiple image areas defined by the multi-screen display controlling server according to several embodiments of the present disclosure.
Figure 6:
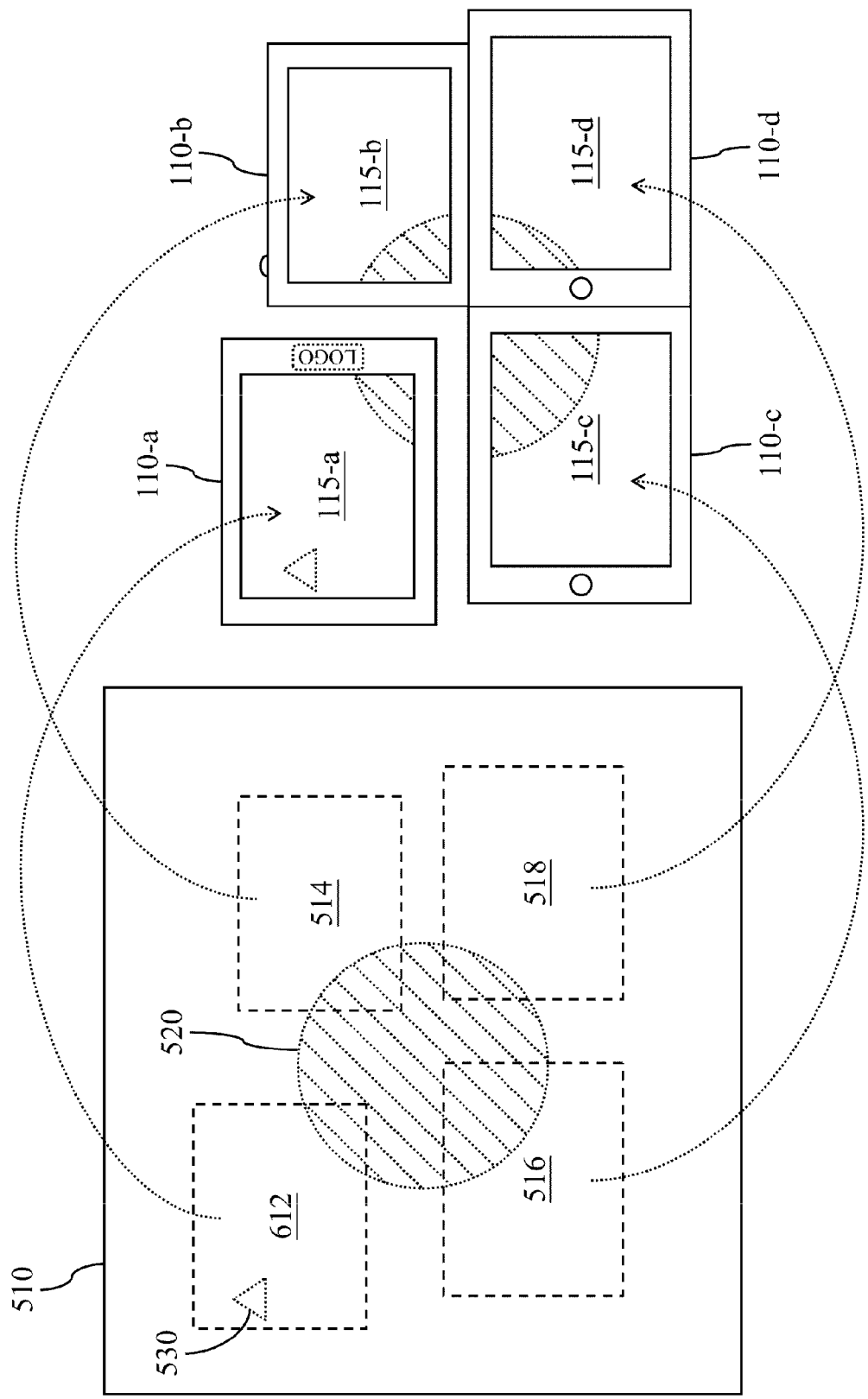
Figure 7:
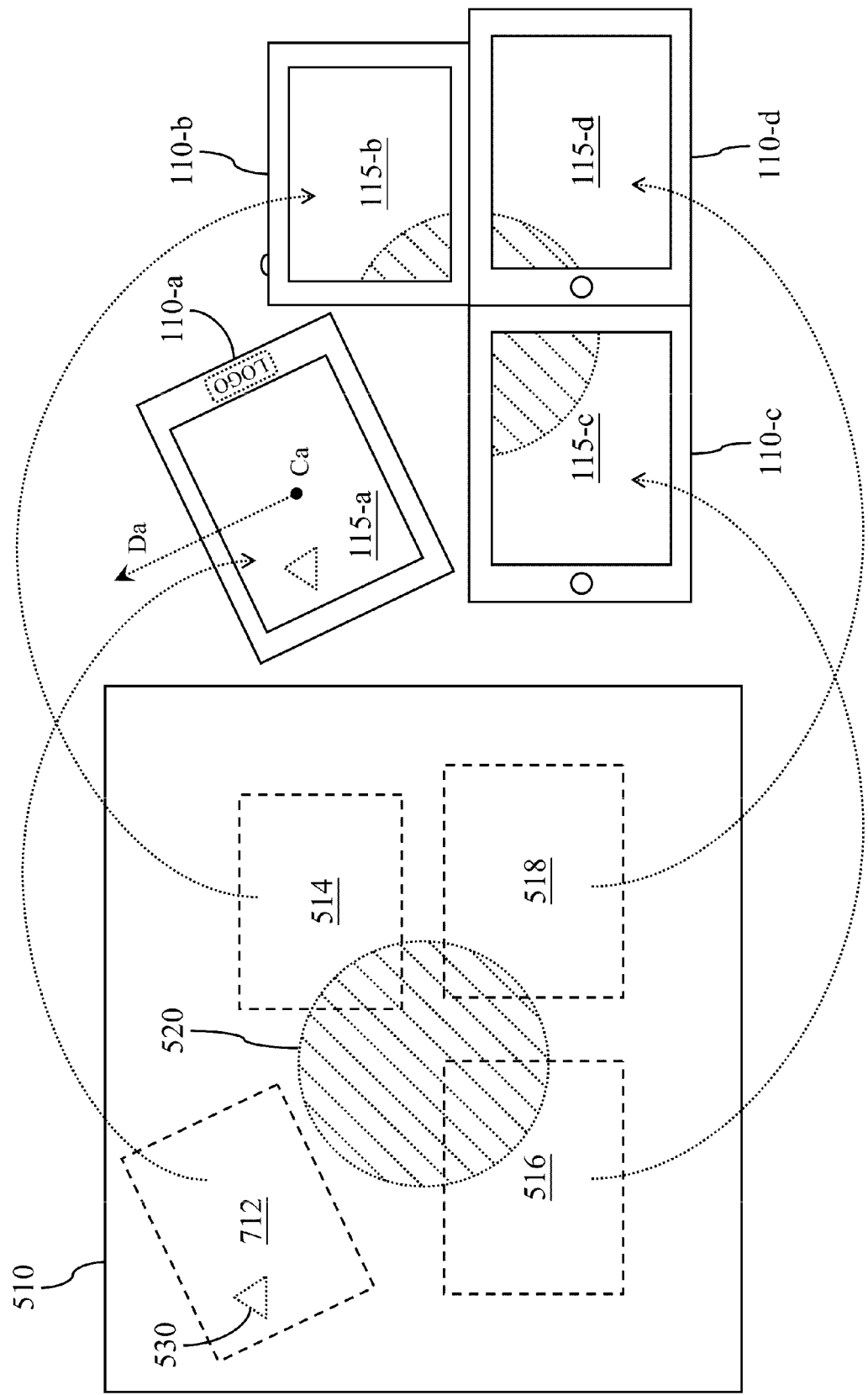

FIG. 3 shows a simplified flowchart illustrating a video playback method according to one embodiment of the present disclosure. FIG. 4 shows a simplified schematic diagram of spatial locations for partial portable communication devices in FIG. 1 according to one embodiment of the present disclosure. FIG. 5 through FIG. 7 show simplified schematic diagrams illustrating mapping relationship between a visible area 510 of the target video and multiple image areas defined by the multi-screen display controlling server 130 according to several embodiments of the present disclosure.

In the flowchart of FIG. 3, operations within a column under the name of a specific device are operations to be performed by the specific device. For example, operations within a column under the label "location detection circuit" are operations to be performed by the location detection circuit 120; operations within a column under the label "multi-screen display controlling server" are operations to be performed by the multi-screen display controlling server 130; operations within a column under the label "portable communication device 120-a" are operations to be performed by the portable communication device 110-a; operations within a column under the label "other portable communication devices" are operations to be performed by the other portable communication devices 110-b~110-n; and so forth. The same analogous arrangement also applies to the subsequent flowcharts.

When performing the video playback method of each flowchart in the drawings, the control circuit 131 of the multi-screen display controlling server 130 executes the computer program product 137 to enable the multi-screen display controlling server 130 to perform a multi-screen display controlling operation comprising some or all operations within the corresponding column.

When users of the portable communication devices 110-a~110-n want to watch the target video, the may place the portable communication devices 110-a~110-n together in any order, such as the pattern shown in FIG. 5, and utilize the location detection circuit 120 to perform the operation 302 of FIG. 3.

In the operation 302, the location detection circuit 120 may dynamically detect a spatial location and an orientation for each of the portable communication devices 110-a~110-n to generate information related to the spatial location and the orientation for each of the portable communication devices 110-a~110-n. The location detection circuit 120 may transmit the detection results to at least one of the portable communication devices 110-a~110-n through a wireless transmission approach.

In the multi-screen video playback system 100, a spatial location of a particular geometry characteristic of the portable communication device 110, a spatial location of a particular symbol of the portable communication device 110, a spatial location of a particular element of the portable communication device 110, a spatial location of a particular region of the portable communication device 110, or a spatial location of a particular geometry characteristic of the screen 115 may be utilized to represent a spatial location of the portable communication device 110.

For example, the location detection circuit 120 may detect and utilize a centroid location of the portable communication device 110 to represent the spatial location of the portable communication device 110. Alternatively, the location detection circuit 120 may detect and utilize a centroid location of the screen 115 to represent the spatial location of the portable communication device 110.

In practice, the location detection circuit 120 may cooperate with respective portable communication devices 110-a~110-n to compute respective spatial locations of the portable communication devices 110-a~110-n. For example, in the embodiment of FIG. 4, the location detection circuit 120 may detect and transmit spatial coordinates of reference points 411~414 of the portable communication device 110-*a* to the portable communication device 110-*a*. Since a length and a width of the portable communication device 110-*a* are given values, the portable communication device 110-*a* may utilize the control circuit 111-*a* to compute a centroid location of the portable communication device 110-*a* according to the spatial coordinates of some or all of the reference points 411~414 to represent a spatial location of the portable communication device 110-*a*.

Similarly, the location detection circuit 120 may detect and transmit spatial coordinates of reference points 421~424 of the portable communication device 110-*b* to the portable communication device 110-*b*. Since a length and a width of the portable communication device 110-*b* are given values, the portable communication device 110-*b* may utilize the control circuit 111-*b* to compute a centroid location of the portable communication device 110-*b* according to the spatial coordinates of some or all of the reference points 421~424 to represent a spatial location of the portable communication device 110-*b*.

Similarly, the location detection circuit 120 may detect and transmit spatial coordinates of reference points 431~434 of the portable communication device 110-*c* to the portable communication device 110-*c*, and may detect and transmit spatial coordinates of reference points 441~444 of the portable communication device 110-*d* to the portable communication device 110-*d*. The above location computation method is also applicable to the portable communication devices 110-*c* and 110-*d*.

Alternatively, the portable communication device 110 may utilize the control circuit 111 to compute the centroid location of the screen 115 according to the received spatial coordinates of the reference points to represent the spatial location of the portable communication device 110. For example, in the embodiment of FIG. 4, since the length and the width of the portable communication device 110-*a* are given values, a size of a screen 115-*a* is given, and a spatial arrangement of the screen 115-*a* with respect to the portable communication device 110-*a* is given as well, the portable communication device 110-*a* may utilize the control circuit 111-*a* to compute a location of a centroid Ca of the screen 115-*a* according to the spatial coordinates of some or all of the reference points 411~414 to represent the spatial location of the portable communication device 110-*a*.

Similarly, since the length and the width of the portable communication device 110-*b* are given values, a size of a screen 115-*b* is given, and a spatial arrangement of the screen 115-*b* with respect to the portable communication device 110-*b* is given as well, the portable communication device 110-*b* may utilize the control circuit 111-*b* to compute a location of a centroid Cb of the screen 115-*b* according to the spatial coordinates of some or all of the reference points 421~424 to represent the spatial location of the portable communication device 110-*b*. This location computation method is also applicable to the portable communication devices 110-*c* and 110-*d*.

In addition, the location detection circuit 120 may further identify and detect locations of one or more reference objects or symbols of the portable communication device 110, and compare the locations of the reference objects or symbols of the portable communication device 110 with locations of other reference points to determine an orientation of the portable communication device 110. For example, in the embodiment of FIG. 4, the location detection circuit 120 may identify and detect a location of a brand logo 415 of the portable communication device 110-*a*, and compare the location of the brand logo 415 with the spatial coordinates of some or all of the aforementioned reference points 411~414 to determine the orientation of the portable communication device 110-*a*. The location detection circuit 120 may identify and detect a location of a control button 425 of the portable communication device 110-*b*, and compare the location of the control button 425 with the spatial coordinates of some or all of the aforementioned reference points 421~424 to determine the orientation of the portable communication device 110-*b*. The location detection circuit 120 may identify and detect a location of a control button 435 of the portable communication device 110-*c*, and compare the location of the control button 435 with the spatial coordinates of some or all of the aforementioned reference points 431~434 to determine the orientation of the portable communication device 110-*c*. Similarly, the location detection circuit 120 may identify and detect a location of a control button 445 of the portable communication device 110-*d*, and compare the location of the control button 445 with the spatial coordinates of some or all of the aforementioned reference points 441~444 to determine the orientation of the portable communication device 110-*d*.

Alternatively, the location detection circuit 120 may transmit the location detection results of the one or more reference objects or symbols to the portable communication device 110 as well as the location detection results of other reference points. Then the portable communication device 110 may utilize the control circuit 111 to compare the locations of the one or more reference objects or symbols with the locations of other reference points to determine the orientation of the portable communication device 110. Such computation method reduces computation loading of the location detection circuit 120.

In the following description, the orientation of the portable communication device 110-*a* is represented by an orientation direction Da, the orientation of the portable communication device 110-*b* is represented by an orientation direction Db, the orientation of the portable communication device 110-*c* is represented by an orientation direction Dc, and the orientation of the portable communication device 110-*d* is represented by an orientation direction Dd. Please note that the terms "orientation" and "orientation direction" used throughout the description and the claims are intended to describe the placement of the portable communication device 110 in use, and not refer to the signal transmitting direction or signal receiving direction of the communication circuit 113 of the portable communication device 110.

For the purpose of explanatory convenience in the following description, it is assumed hereinafter that the multi-screen video playback system 100 utilizes the centroid location of the screen 115 to represent the spatial location of the portable communication device 110.

In operations, the spatial location and the orientation of the portable communication device 110 may vary as the user's location or posture changes when manipulating the portable communication device 110. Accordingly, the location detection circuit 120 may perform the aforementioned operation 302 continuously or intermittently to dynamically detect the spatial location and the orientation for each of the portable communication devices 110-*a*~110-*n*, and transmit information related to the spatial location and the orientation for each of the portable communication devices 110-*a*~110-*n* to one or more portable communication devices that require such information through a wireless transmission approach.

In the operation 304, the portable communication device 110 may utilize the communication circuit 113 to dynamically receive information related to the spatial location and the orientation for the portable communication device 110 from the location detection circuit 120 through a wireless transmission approach, and record the received information. In addition, the portable communication device 110 may also utilize the communication circuit 113 to dynamically receive information related to the spatial locations and the orientations of the other portable communication devices from the location detection circuit 120 or from the other portable communication devices, and record the received information.

The portable communication device 110 may periodically or intermittently perform the aforementioned operation 304 to dynamically receive the latest information generated by the location detection circuit 120 or other portable communication devices, and then update the record related to the spatial locations and the orientations of the portable communication devices 110-a~110-n.

In the operation 306, the portable communication device 110 may utilize the communication circuit 113 to communicate with the multi-screen display controlling server 130 via a network to transmit an identity authentication request to the multi-screen display controlling server 130. At this time, the receiving module 220 of the multi-screen display controlling server 130 receives the identity authentication request transmitted from the portable communication device 110, and the group setting module 210 conducts an identity authentication procedure to the portable communication device 110, and establishes a device group relationship among the portable communication devices 110-a~110-n.

When conducting the identity authentication procedure, the group setting module 210 may request the user of the first the portable communication device 110 connected to the multi-screen display controlling server 130 to select or input a specific group ID. For the purpose of explanatory convenience in the following description, it is assumed hereinafter that the first the portable communication device 110 connected to the multi-screen display controlling server 130 is the portable communication device 110-a. When the multi-screen display controlling server 130 conducts the identity authentication procedure to the other portable communication devices 110-b~110-n, the multi-screen display controlling server 130 may request the user of the other portable communication devices 110-b~110-n to select or input a group ID. In one embodiment, when the group ID configured by the other portable communication devices 110-b~110-n matches with the group ID configured by the portable communication device 110-a, the group setting module 210 determines that the other portable communication devices 110-b~110-n passed the identity authentication procedure, and adds the portable communication devices 110-a~110-n using the same group ID to the same device group.

Alternatively, the portable communication devices 110-a~110-n may utilize appropriate communication circuits, such as near field communication (NFC) circuits, Bluetooth circuits, WiFi circuits, or the like, to conduct device matching between each other in the operation 306, and the matching information may be transmitted to the multi-screen display controlling server 130 from at least one of the portable communication devices 110-a~110-n. In one embodiment, when the receiving module 220 of the multi-screen display controlling server 130 received the matching information from one of the portable communication devices 110-a~110-n, the group setting module 210 determines that the portable communication devices 110-a~110-n specified in the matching information passed the identity authentication procedure, and adds the portable communication devices 110-a~110-n to the same device group.

In configuring the member devices of the aforementioned device group, the group setting module 210 may further request the portable communication device 110 to provide information related to the spatial location and the orientation of the portable communication device 110. In one embodiment, the group setting module 210 may add portable communication devices to the same device group only if the portable communication devices are located within a predetermined range. In this situation, the group setting module 210 may add a specific portable communication device and other portable communication devices to the same device group only if the specific portable communication device passed the aforementioned identity authentication procedure and a distance between the specific portable communication device and a neighboring portable communication device is less than a threshold value.

For example, in the embodiment of FIG. 4, the group setting module 210 may add the portable communication device 110-a and the portable communication device 110-b to a same device group only if a distance between the portable communication device 110-a and the portable communication device 110-b is less than the threshold value, such as 10, 15, or 20 centimeters. Similarly, the group setting module 210 may add the portable communication device 110-c and the portable communication device 110-a to the same device group only if a distance between the portable communication device 110-c and the portable communication device 110-a is less than the threshold value.

Additionally, in the aforementioned operation 306, the video area partitioning module 230 of the multi-screen display controlling server 130 may further request the portable communication device 110 in the aforementioned device group to provide information related to the size of the screen 115, and a spatial arrangement of the screen 115 with respect to the portable communication device 110, to assist the video area partitioning module 230 to determine a relative position among multiple screens 115. For example, in the previous embodiment, the portable communication device 110 may provide a device serial number of the portable communication device 110 to the video area partitioning module 230. The video area partitioning module 230 may determine the size and location of the screen 115 according to the specification corresponding to the device serial number of the portable communication device 110 and information related to the location and orientation of the portable communication device 110. In this way, the video area partitioning module 230 is able to compute the relative position among the multiple screens 115 in the aforementioned device group.

In the operation 308, the video area partitioning module 230 of the multi-screen display controlling server 130 defines multiple non-overlap image areas in the visible area of the target video according to the quantity of the portable communication devices in the aforementioned device group and respective areas of the screens of the portable communication devices, so that a relative position among the multiple image areas matches with a relative position among the multiple portable communication devices.

For the purpose of explanatory convenience in the following description, it is assumed hereinafter that the aforementioned device group includes four portable communication devices 110-a~110-d, and the operations 308 through 324 will be further described with reference to FIG. 5 through FIG. 7.

In FIG. 5 through FIG. 7, reference numbers 520 and 530 denote two image objects in the target video. As shown in FIG. 5, the video area partitioning module 230 in the operation 308 defines four non-overlap image areas 512, 514, 516, and 518 in the visible area 510 of the target video according to the quantity of the portable communication devices 110-a~110-d and respective areas of the screens 115-a~115-d, so that a relative position among the image areas 512, 514, 516, and 518 matches with a relative position among the portable communication devices 110-a~110-d.

As described previously, the multi-screen video playback system 100 of this embodiment utilizes the centroid location of the screen 115 to represent the spatial location of the portable communication device 110. Accordingly, the relative position among the image areas 512, 514, 516, and 518 defined by the video area partitioning module 230 would also match with a relative position among the screens 115-a~115-d of the portable communication devices 110-a~110-d.

As shown in FIG. 5, the image areas 512, 514, 516, and 518 do not contact with each other, and the gaps among the image areas 512, 514, 516, and 518 may be equal to or proportional to the gaps among the screens 115-a~115-d. In addition, respective areas of the image areas 512, 514, 516, and 518 may be equal to or proportional to respective areas of the screens 115-a~115-d.

In the embodiment of FIG. 5, a total area of the image areas 512, 514, 516, and 518 is less than an area of the visible area 510 of the target video, and a total area of the screens 115-a~115-d is also less than the total area of the visible area 510 of the target video.

In the operation 310, the partitioned video providing module 240 of the multi-screen display controlling server 130 dynamically generates four partitioned videos respectively corresponding to the image areas 512, 514, 516, and 518 of the visible area 510 of the target video according to the image area partitioning result made by the video area partitioning module 230.

In the operation 312, the partitioned video providing module 240 utilizes the communication circuit 133 to respectively transmit the multiple partitioned videos to the portable communication devices 110-a~110-d of the same device group. In this embodiment, the partitioned video providing module 240 transmits a partitioned video corresponding to the image area 512 to the portable communication device 110-a, transmits a partitioned video corresponding to the image area 514 to the portable communication device 110-b, transmits a partitioned video corresponding to the image area 516 to the portable communication device 110-c, and transmits a partitioned video corresponding to the image area 518 to the portable communication device 110-d.

In the operation 314, the portable communication devices 110-a~110-d utilize the communication circuits 113-a~113-d to respectively receive the multiple partitioned videos transmitted from the multi-screen display controlling server 130.

Then, in the operation 316, the displaying control module 250 of the multi-screen display controlling server 130 controls the portable communication devices 110-a~110-d to respectively display the multiple partitioned videos on the screens 115-a~115-d to jointly display at least a portion of the visible area 510 of the target video, so that the user can watch the target video through the screens 115-a~115-d.

As described previously, while the screens 115-a~115-d display the multiple partitioned videos, the location detection circuit 120 and the portable communication devices 110-a~110-d may periodically or intermittently perform the aforementioned operations 302 and 304 to dynamically update the record related to the spatial locations and the orientations of the portable communication devices 110-a~110-d.

While the screens 115-a~115-d display the multiple partitioned videos, if the location or orientation of any portable communication device 110 of the aforementioned device group changes, the multi-screen display controlling server 130 performs the operation 318 to dynamically generate an corresponding adjusted partitioned video.

In practice, the location detection circuit 120 or at least one of the portable communication devices 110-a~110-d may periodically or intermittently transmit information related to the spatial locations and the orientations of the portable communication devices 110-a~110-d to the multi-screen display controlling server 130. The video area partitioning module 230 of the multi-screen display controlling server 130 may compare the received information with the existing record to determine whether any portable communication device 110 changes its location or orientation.

Alternatively, the location detection circuit 120 or at least one of the portable communication devices 110-a~110-d may transmit the new location or new orientation direction of a specific portable communication device in the portable communication devices 110-a~110-d to the multi-screen display controlling server 130 only when the location or orientation of the specific portable communication device 110 changes. Accordingly, while the screens 115-a~115-d display the multiple partitioned videos, once the receiving module 220 of the multi-screen display controlling server 130 received the new location or new orientation direction of the specific portable communication device 110, the video area partitioning module 230 determines that the location or orientation of the specific portable communication device 110 changes.

For the purpose of explanatory convenience in the following description, it is assumed hereinafter that the location or orientation of the portable communication device 110-a changes while the screens 115-a~115-d display the multiple partitioned videos. In the operation 318, the video area partitioning module 230 defines an adjusted image area corresponding to the new location or new orientation direction of the portable communication device 110-a in the visible area 510 of the target video. The partitioned video providing module 240 then dynamically generates an adjusted partitioned video corresponding to the adjusted image area.

For example, as shown in FIG. 6, in the case of that the location of the portable communication device 110-a changes, but the orientation of the portable communication device 110-a does not change, the video area partitioning module 230 defines an adjusted image area 612 in the visible area 510 of the target video corresponding to the new location of the portable communication device 110-a. The partitioned video providing module 240 then dynamically generates an adjusted partitioned video corresponding to the adjusted image area 612.

For another example, as shown in FIG. 6, in the case of that both the location and orientation of the portable communication device 110-a change, the video area partitioning module 230 defines an adjusted image area 712 in the visible area 510 of the target video corresponding to the new location and new orientation of the portable communication device 110-a. The partitioned video providing module 240 then dynamically generates an adjusted partitioned video corresponding to the adjusted image area 712.

In the operation 320, the partitioned video providing module 240 utilizes the communication circuit 133 to transmit the adjusted partitioned video corresponding to the adjusted image area to the portable communication device 110-a via a network.

In the operation 322, the portable communication device 110-a utilizes the communication circuit 113-a to receive the adjusted partitioned video transmitted from the multi-screen display controlling server 130.

In the operation 324, the displaying control module 250 controls the portable communication device 110-a to utilize the screen 115-a to display the adjusted partitioned video, so that the screen 115 cooperates with the screen 115-b~115-d to jointly display at least a portion of the visible area 510 of the target video, and the user can watch the target video through the screens 115-a~115-d.

As shown in FIG. 5 through FIG. 7, as the portable communication device 110-a moves, the partitioned video displayed on the screen 115-a changes to correspond to different image areas in the visible area 510 of the target video. The user is thus allowed to explore different image areas in the visible area 510 of the target video by moving the portable communication device 110-a. Therefore, the multi-screen video playback system 100 provides the user with additional pleasure in exploring image contents, thereby creating a fantastic user experience that is not possible to realize in the traditional video-wall system.

As can be appreciated from the foregoing descriptions, the multi-screen video playback system 100 utilizes the location detection circuit 120 to dynamically detect the locations and orientations of the portable communication devices 110-a~110-d. The computer program product 137 of the multi-screen display controlling server 130 dynamically generates multiple corresponding partitioned videos according to the relative position among the portable communication devices 110-a~110-d and the respective areas of the screens 115-a~115-d, and respectively displays the multiple partitioned videos on the screens 115-a~115-d. In addition, while the screens 115-a~115-d display the multiple partitioned videos, if the location or orientation of any specific portable communication device in the portable communication devices 110-a~110-d changes, the multi-screen display controlling server 130 would dynamically generate corresponding adjusted partitioned video and displays the adjusted partitioned video on the screen of the specific portable communication device.

Accordingly, the multi-screen video playback system 100 is capable of supporting various combinations of different portable communication devices, and does not restrict the number of the portable communication devices used, the size of the screen arranged on each portable communication device, the placement of the portable communication devices, and the operating system installed in each portable communication device. Such structure not only effectively increases the displaying area of the target video, but also provides excellent convenience in use and great flexibility in device combination.

In practice, in addition to dynamically generate multiple partitioned videos to be displayed on the screens 115-a~115-d according to the detection results of the location detection circuit 120, the multi-screen video playback system 100 may dynamically change the multiple partitioned videos to be displayed on the screens 115-a~115-d based on the user's instructions.

The operations of the multi-screen video playback system 100 will be further described in the following with reference to FIG. 8 and FIG. 9.

Figure 8:
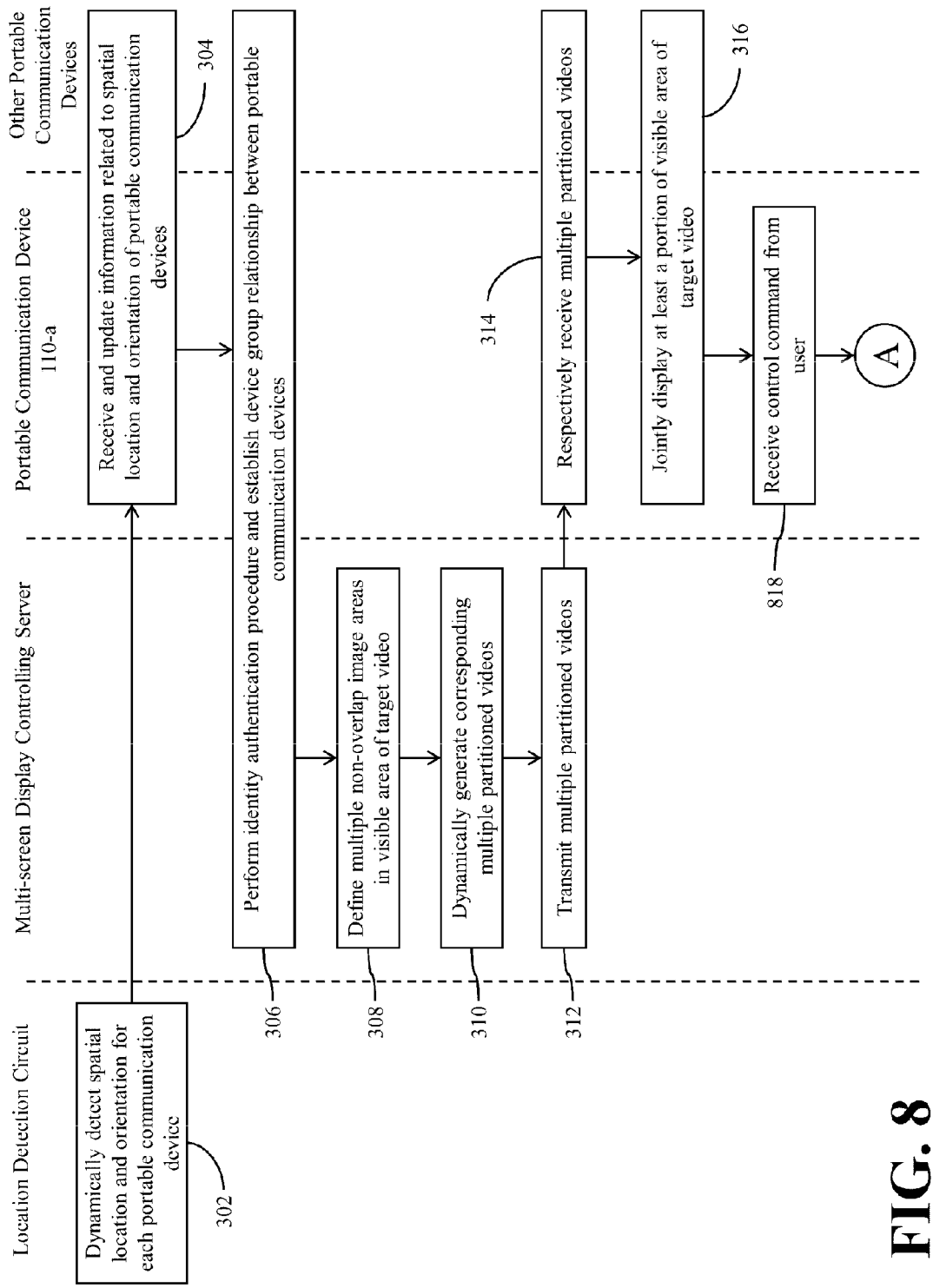
FIG. 8 and FIG. 9 collectively show a simplified flowchart illustrating a video playback method according to another embodiment of the present disclosure.
Figure 9:
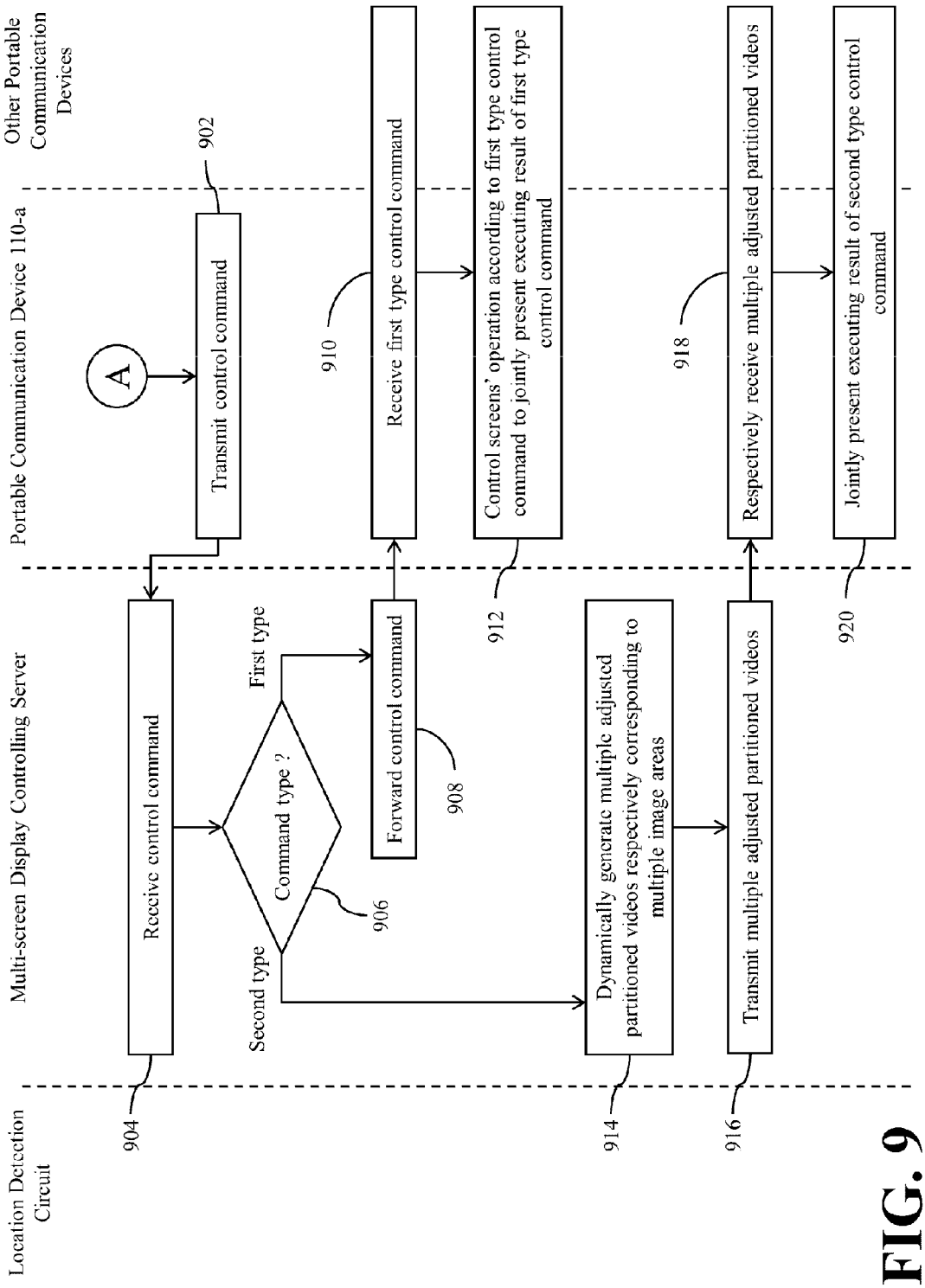

FIG. 8 and FIG. 9 show a simplified flowchart illustrating a video playback method according to another embodiment of the present disclosure.

The operations 302 through 316 in FIG. 8 are the same as the operations 302 through 316 in FIG. 3. Accordingly, the descriptions regarding the implementations and related advantages for the operations 302 through 316 in FIG. 3 are also applicable to the embodiment of FIG. 8. For simplicity, the descriptions will not be repeated here.

While the screens 115-a~115-d display the multiple partitioned videos generated by the multi-screen display controlling server 130, the user may input a playback control command to any of the portable communication devices 110-a~110-d or to a default device of the portable communication device 110 in order to adjust the image contents displayed on the screens 115-a~115-d. In practice, the aforementioned playback control command may be a fast forward command, a fast backward command, a pause command, a video scaling command, or a video moving command.

For the purpose of explanatory convenience in the following description, it is assumed hereinafter that the user inputs the playback control command to the portable communication device 110-a. In this situation, the portable communication device 110-a performs the operation 818 of FIG. 8 to receive the playback control command inputted by the user.

Then, the portable communication device 110-a performs the operation 902 of FIG. 9 to utilize the communication circuit 113-a to transmit the received playback control command to the multi-screen display controlling server 130 via a network.

In this embodiment, while the screens 115-a~115-d display the multiple partitioned videos, if the user changes the location of the portable communication device 110-a to change a distance between the portable communication device 110-a and the location detection circuit 120, the control circuit 111-a of the portable communication device 110-a generates a video scaling command. For example, if the user moves the location of the portable communication device 110-a toward he location detection circuit 120 to reduce the distance between the portable communication device 110-a and the location detection circuit 120, the control circuit 111-a of the portable communication device 110-a generates a video zoom-in (enlarge) command. On the contrary, if the user moves the portable communication device 110-a away from the location detection circuit 120 to increase the distance between the portable communication device 110-a and the location detection circuit 120, the control circuit 111-a of the portable communication device 110-a generates a video zoom-out (shrink) command. In other words, the multi-screen video playback system 100 enables the user to issue a video scaling command by adjusting the distance between the portable communication device 110 and the location detection circuit 120.

In the operation 904, the receiving module 220 of the multi-screen display controlling server 130 receives the playback control command transmitted from the portable communication device 110.

In the operation 906, the displaying control module 250 determines the command type of the playback control command. If the playback control command belongs to a first type command, the multi-screen display controlling server 130 performs the operation 908. If the playback control command belongs to a second type command, the multi-screen display controlling server 130 performs the operation 914. In this embodiment, the aforementioned first type command refers to a control command that does not require the multi-screen display controlling server 130 to re-generate multiple partitioned videos, such as a fast forward command, a fast backward command, or a pause command. The aforementioned second type command refers to a control command that requires the multi-screen display controlling server 130 to re-generate multiple partitioned videos, such as a video scaling command or a video moving command.

In the operation 908, the displaying control module 250 utilizes the communication circuit 133 to forward the playback control command to the portable communication devices 110-a~110-d via a network.

In the operation 910, the portable communication devices 110-a~110-d respectively utilize the communication circuits 113-a~113-d to receive the playback control command transmitted from the multi-screen display controlling server 130.

In the operation 912, the control circuit 111-a~111-d of the portable communication devices 110-a~110-d respectively control the displaying operations of the screens 115-a~115-d according to the playback control command to jointly present the executing result of playback control command. For example, if the playback control command is a fast forward command, the control circuit 111-a~111-d simultaneously fast forward the videos displayed on the screens 115-a~115-d according to the playback control command to jointly present the fast forward process.

For another example, if the playback control command is a fast backward command, the control circuit 111-a~111-d simultaneously fast backward the videos displayed on the screens 115-a~115-d according to the playback control command to jointly present the fast backward process.

For another example, if the playback control command is a pause command, the control circuit 111-a~111-d simultaneously pause the videos displayed on the screens 115-a~115-d according to the playback control command to jointly present the video pausing status.

In order to facilitate the descriptions for the other operations 914 through 920 of FIG. 9, it is assumed hereinafter that the playback control command is a video zoom-in command.

In the operation 914, the video area partitioning module 230 re-defines four non-overlap image areas in the visible area of the target video according to the quantity of the portable communication devices 110-a~110-d and respective areas of the screens 115-a~115-d, so that a relative position among the re-defined image areas matches with the relative position among the portable communication devices 110-a~110-d.

Figure 10:
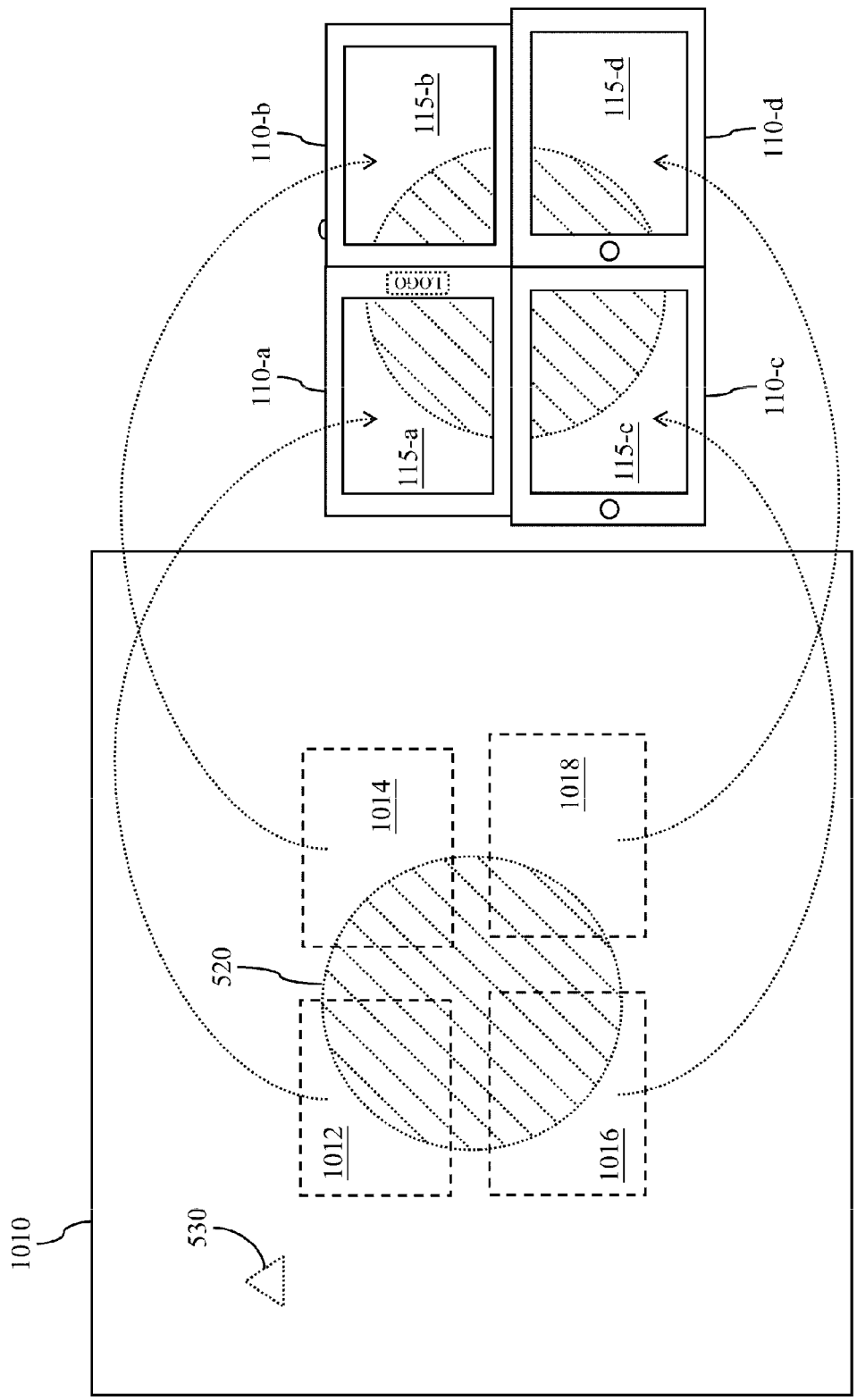
FIG. 10 shows a simplified schematic diagram illustrating mapping relationship between the visible area of the target video and multiple image areas defined by the multi-screen display controlling server according to another embodiment of the present disclosure.

Since the playback control command is a video zoom-in command, the video area partitioning module 230 in the operation 914 may perform an interpolation operation on the image content of the visible area 510 of the target video to form an enlarged visible area, such as a visible area 1010 illustrated in FIG. 10. In the visible area 1010, image objects 1020 and 1030 are respectively the enlarged versions of the image objects 520 and 530 in the visible area 510.

Similarly, the video area partitioning module 230 defines four non-overlap image areas 1012, 1014, 1016, and 1018 in the visible area 1010 of the target video according to the quantity of the portable communication devices 110-a~110-d and respective areas of the screens 115-a~115-d, so that a relative position among the image areas 1012, 1014, 1016, and 1018 matches with the relative position among the portable communication devices 110-a~110-d.

As shown in FIG. 10, the image areas 1012, 1014, 1016, and 1018 do not contact with each other, and the gaps among the image areas 1012, 1014, 1016, and 1018 may be equal to or proportional to the gaps among the screens 115-a~115-d. In addition, respective areas of the image areas 1012, 1014, 1016, and 1018 may be equal to or proportional to respective areas of the screens 115-a~115-d.

Then, the partitioned video providing module 240 dynamically generates four partitioned videos respectively corresponding to the image areas 1012, 1014, 1016, and 1018 of the visible area 1010 of the target video according to the image area partitioning result made by the video area partitioning module 230.

In the operation 916, the partitioned video providing module 240 utilizes the communication circuit 133 to respectively transmit the multiple partitioned videos to the portable communication devices 110-a~110-d. In this embodiment, the partitioned video providing module 240 transmits a partitioned video corresponding to the image area 1012 to the portable communication device 110-a, transmits a partitioned video corresponding to the image area 1014 to the portable communication device 110-b, transmits a partitioned video corresponding to the image area 1016 to the portable communication device 110-c, and transmits a partitioned video corresponding to the image area 1018 to the portable communication device 110-d.

In the operation 918, the portable communication devices 110-a~110-d utilize the communication circuits 113-a~113-d to respectively receive the multiple partitioned videos transmitted from the multi-screen display controlling server 130.

Then, in the operation 920, the displaying control module 250 of the multi-screen display controlling server 130 controls the portable communication devices 110-a~110-d to respectively display the multiple partitioned videos on the screens 115-a~115-d to jointly display at least a portion of the visible area 1010 of the target video, so that the user can watch the zoomed-in version (i.e., the enlarged version) of the target video through the screens 115-a~115-d.

As can be appreciated from the foregoing descriptions, when the user inputs the playback control command to one of the portable communication devices 110-a~110-d, the multi-screen display controlling server 130 correspondingly adjusts the image contents displayed on the screens 115-a~115-d according to the type of the playback control command.

In the aforementioned embodiment of FIG. 9, the operation of determining the command type of the playback control command is performed by the multi-screen display controlling server 130. In practice, the operation of determining the command type of the playback control command may be instead performed by the portable communication device 110.

Figure 11:
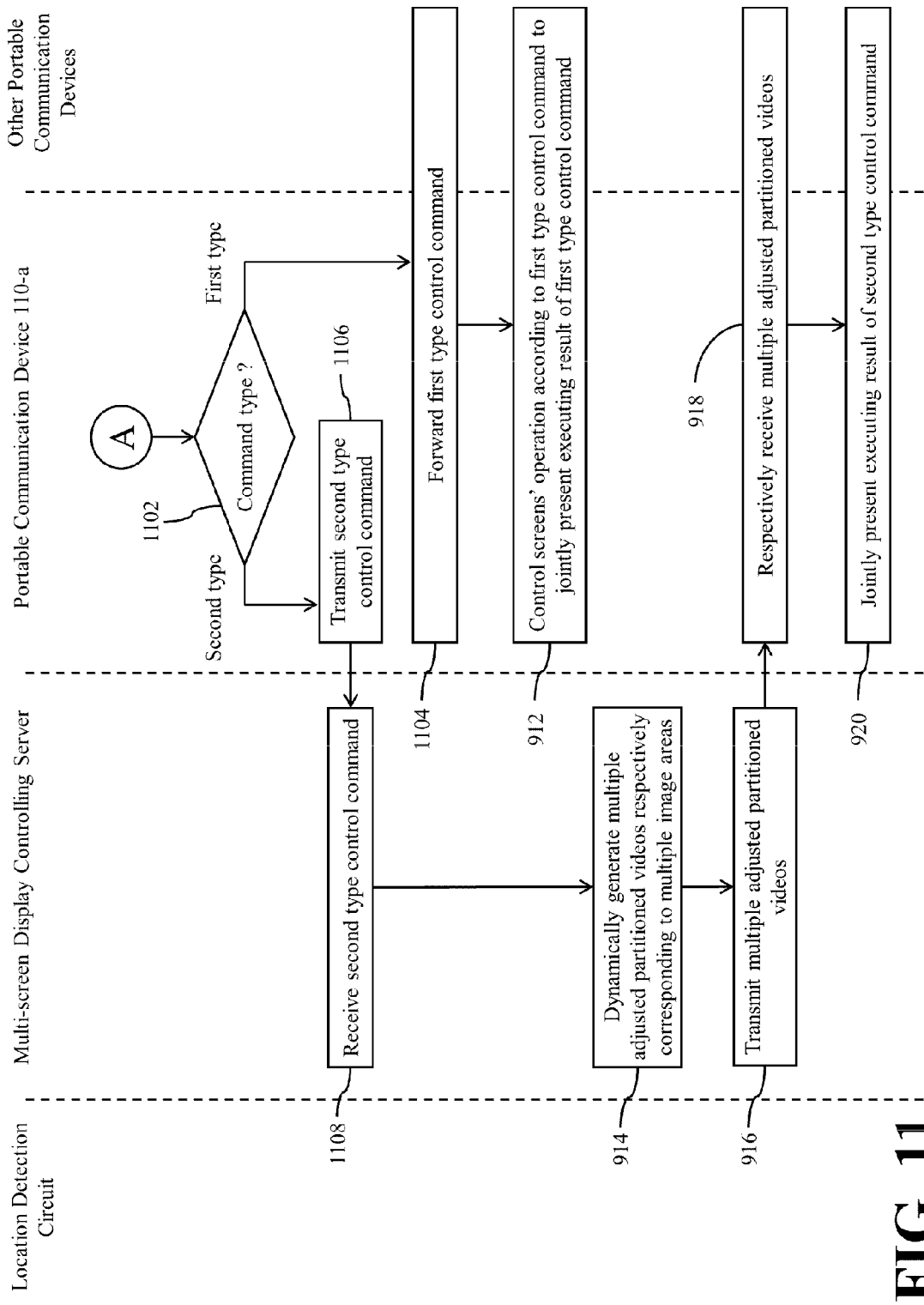
FIG. 11 shows a simplified partial flowchart illustrating a video playback method according to another embodiment of the present disclosure.

For example, FIG. 11 shows a simplified partial flowchart illustrating a video playback method according to another embodiment of the present disclosure. The video playback method illustrated in FIG. 11 is a variation of the video playback method illustrated in FIG. 9.

In the embodiment of FIG. 11, when the portable communication device 110-a finishes the operation 818 of FIG. 8, the control circuit 111-a of the portable communication device 110-a performs the operation 1102 of FIG. 11 to determine the command type of the playback control command. If the playback control command belongs to a first type command, the portable communication device 110-a performs the operation 1104. If the playback control command belongs to a second type command, the portable communication device 110-a performs the operation 1106. Similar to the previous embodiment, the first type command used herein refers to a control command that does not require the multi-screen display controlling server 130 to regenerate multiple partitioned videos, such as a fast forward command, a fast backward command, or a pause command. The second type command used herein refers to a control command that requires the multi-screen display controlling server 130 to re-generate multiple partitioned videos, such as a video scaling command or a video moving command.

In the operation 1104, the control circuit 111-a utilizes the communication circuit 113-a to forward the playback control command to other the portable communication device 110-b~110-d in the same device group.

In the operation 1106, the control circuit 111-a utilizes the communication circuit 113-a to transmit the playback control command to the multi-screen display controlling server 130 via a network.

In the operation 1108, the receiving module 220 of the multi-screen display controlling server 130 receives the playback control command transmitted from the portable communication device 110. In this embodiment, the playback control command received by the receiving module 220 is the second type command.

The operations 912 through 920 in FIG. 11 are the same as the operations 912 through 920 in FIG. 9. Accordingly, the descriptions regarding the implementations and related advantages for the operations 912 through 920 in FIG. 9 are also applicable to the embodiment of FIG. 11. For simplicity, the descriptions will not be repeated here.

In the previous embodiments, when the location of the portable communication device 110 changes, the multi-screen display controlling server 130 dynamically generates a corresponding adjusted partitioned video and displays the adjusted partitioned video on the screen 115 of the portable communication device 110. But this is merely an embodiment rather than a restriction to the practical implementations. For example, while the screens 115-a~115-d display the multiple partitioned videos, if the location of the portable communication device 110-b is changed to cause a distance between the portable communication device 110-b and the portable communication device 110-a to be greater than the aforementioned threshold value, the displaying control module 250 of the multi-screen display controlling server 130 may remove the portable communication device 110-b from the device group of the other portable communication devices 110-a, 110-c, and 110-d, and control the portable communication device 110-b to stop displaying video. As a result, the multi-screen video playback system 100 would only utilize the remaining three portable communication devices 110-a, 110-c, and 110-d to continue displaying the partial content of the target video. If the user afterward inputs another playback control command to one of the portable communication devices 110-a, 110-c, and 110-d, the multi-screen display controlling server 130 would only correspondingly adjust the image contents displayed on the portable communication devices 110-a, 110-c, and 110-d, and not adjust the image content displayed on the portable communication device 110-b.

In the previous embodiments, the multiple mage areas defined by the video area partitioning module 230 do not contact with each other, but this merely an embodiment, rather than a restriction to the practical implementations.

Figure 12:
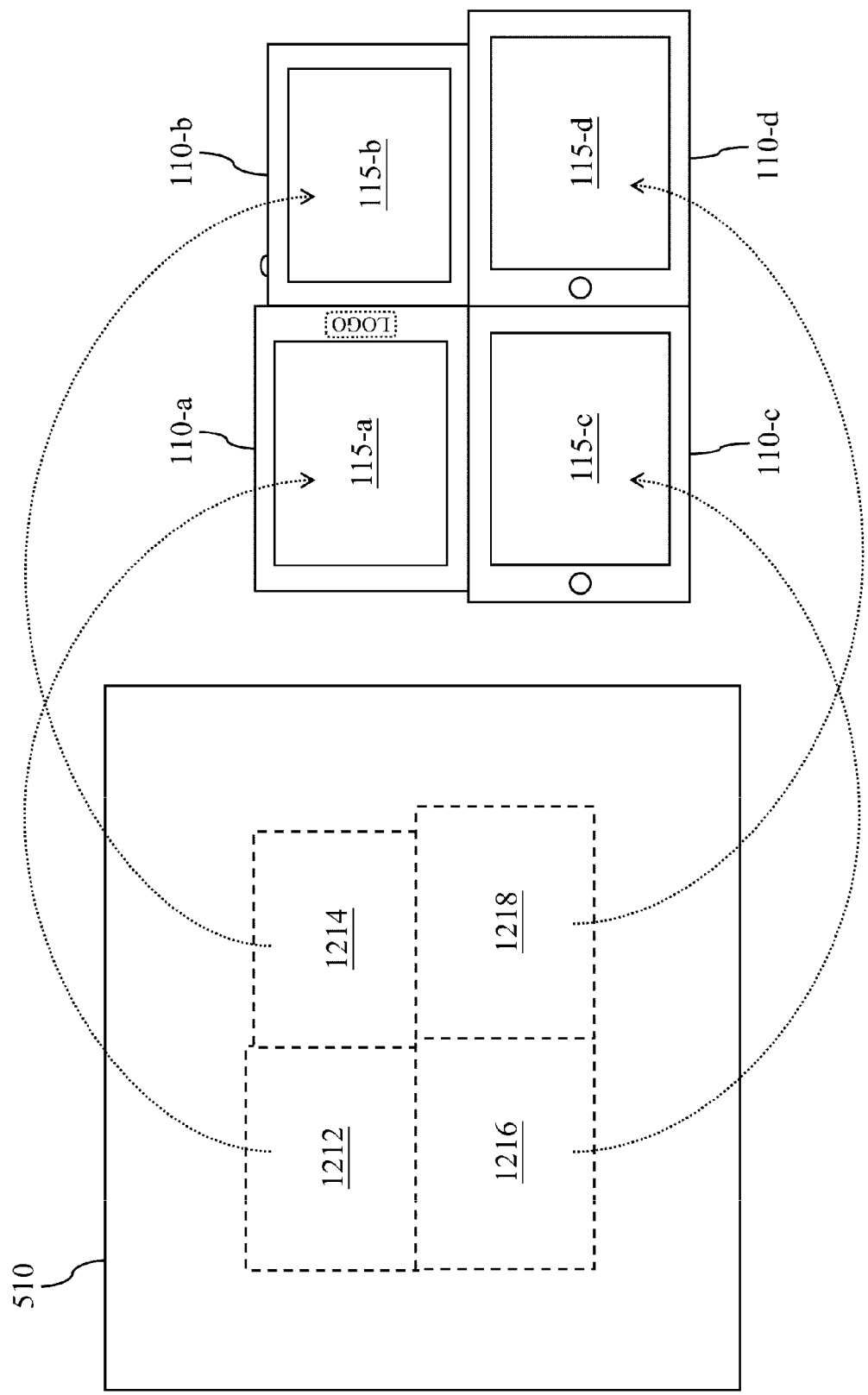
FIG. 12 through FIG. 14 show simplified schematic diagrams illustrating mapping relationship between the visible area of the target video and multiple image areas defined by the multi-screen display controlling server according to several embodiments of the present disclosure.

For example, FIG. 12 shows a simplified schematic diagram illustrating mapping relationship between the visible area 510 of the target video and multiple image areas defined by the multi-screen display controlling server 130 according to another embodiment of the present disclosure. In the embodiment of FIG. 12, the video area partitioning module 230 in the aforementioned operation 308 may define four non-overlap image areas 1212, 1214, 1216, and 1218 in the visible area 510 of the target video according to the quantity of the portable communication devices 110-a~110-d and respective areas of the screens 115-a~115-d, so that a relative position among the image areas 1212, 1214, 1216, and 1218 matches with a relative position among the portable communication devices 110-a~110-d.

As shown in FIG. 12, the image areas 1212, 1214, 1216, and 1218 contact with each other. In addition, respective areas of the image areas 1212, 1214, 1216, and 1218 may be equal to or proportional to respective areas of the screens 115-a~115-d.

Additionally, in the previous embodiments, the total area of the multiple mage areas defined by the video area partitioning module 230 is less than the total area of the visible area of the target video, but this merely an embodiment, rather than a restriction to the practical implementations.

Figure 13:
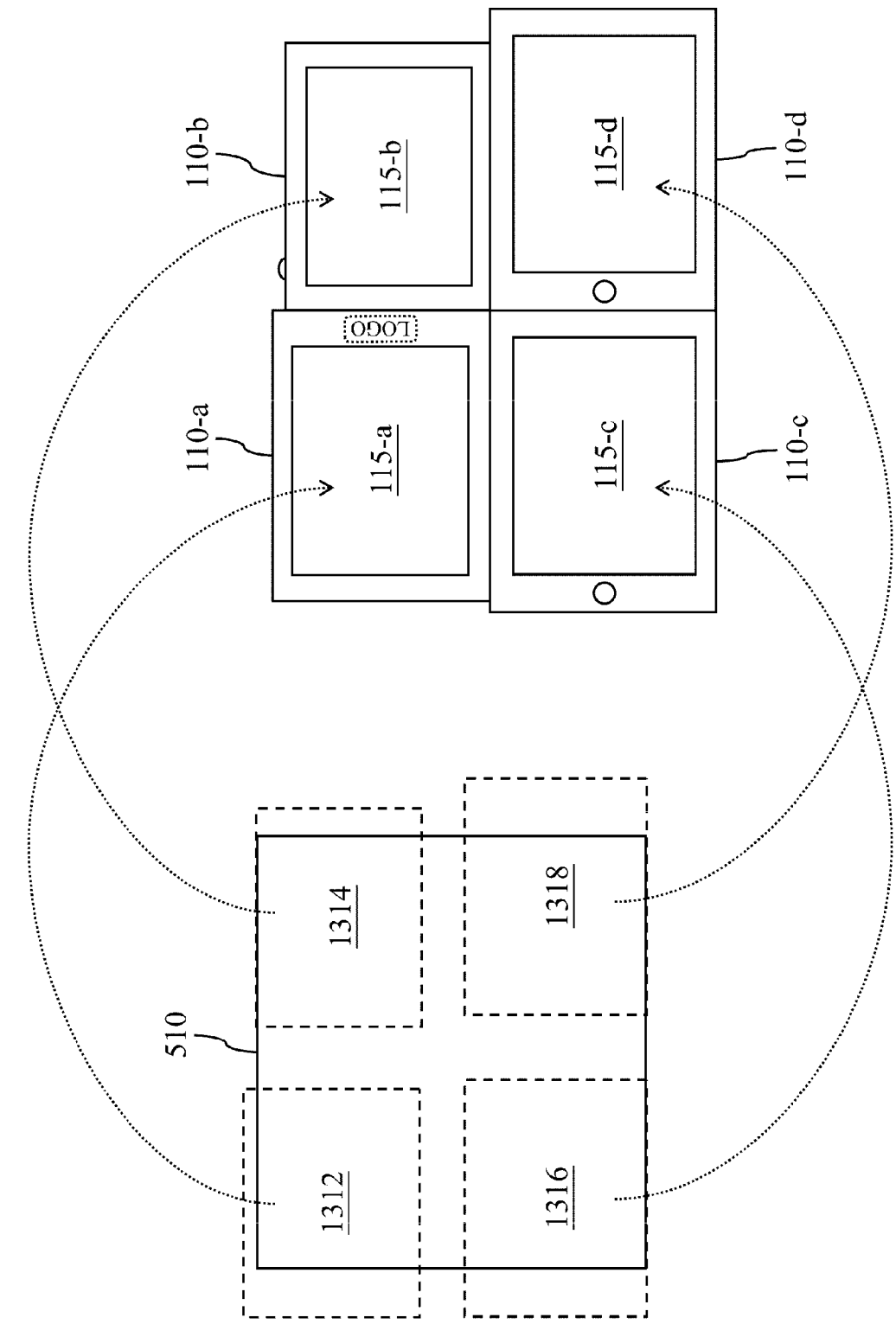
Figure 14:
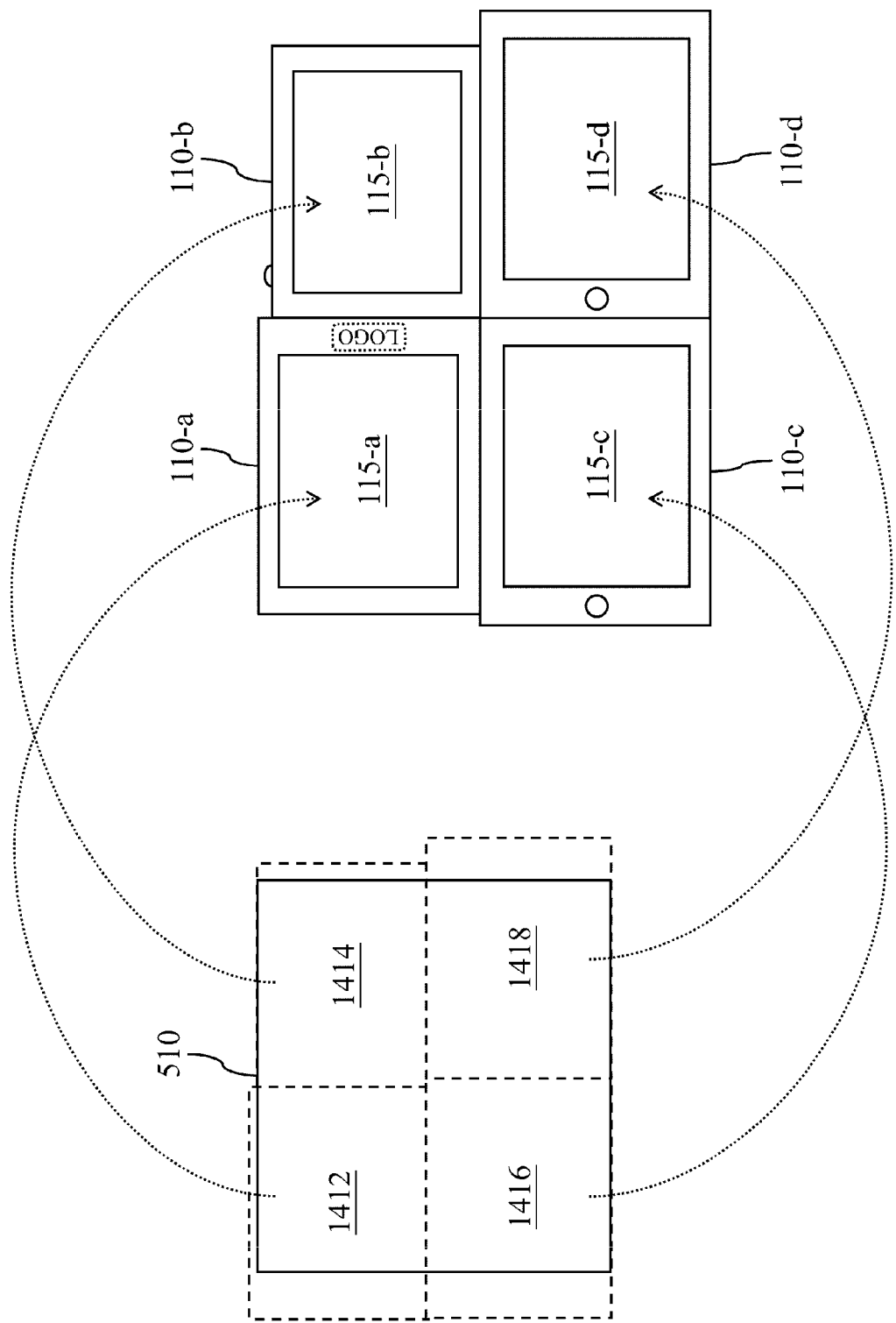

For example, FIG. 13 through FIG. 14 show simplified schematic diagrams illustrating mapping relationship between the visible area 510 of the target video and multiple image areas defined by the multi-screen display controlling server 130 according to different embodiments of the present disclosure.

In the embodiment of FIG. 13, image areas 1312, 1314, 1316, and 1318 defined by the video area partitioning module 230 do not contact with each other, and the gaps among the image areas 1312, 1314, 1316, and 1318 may be equal to or proportional to the gaps among the screens 115-a~115-d. In addition, a total area of the image areas 1312, 1314, 1316, and 1318 is greater than or equal to the total area of the visible area 510 of the target video.

In the embodiment of FIG. 14, image areas 1412, 1414, 1416, and 1418 defined by the video area partitioning module 230 contact with each other, and a total area of the image areas 1412, 1414, 1416, and 1418 is greater than or equal to the total area of the visible area 510 of the target video.

As it can be appreciated from the foregoing descriptions that the multi-screen video playback system 100 enables the user to utilize the popular portable communication devices to jointly display the target video to increase the displaying area of the target video, and not restricts the number of the portable communication devices used, the size of the screen arranged on each portable communication device, the placement of the portable communication devices, and the operating system installed in each portable communication device. Such structure greatly increases the convenience in use and also has the flexibility for supporting cross-platform combination of portable communication devices.

In addition, the multi-screen display controlling server 130 dynamically generates corresponding partitioned videos to be displayed on the portable communication devices according to the placement of the portable communication devices, and does not require the portable communication devices to be placed according to the format of video signals generated by the multi-screen display controlling server 130. Accordingly, the restriction in application is greatly reduced, and the application flexibility of the multi-screen video playback system 100 is thus effectively increased.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an openended fashion, and thus should be interpreted to mean "include, but not limited to." The phrases "be coupled with," "couples with," and "coupling with" are intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A video playback system for jointly displaying video with multiple screens, comprising:

multiple portable communication devices each comprising at least one of the multiple screens, wherein the multiple portable communication devices comprise a first portable communication device having a first screen, and the first screen is one of the multiple screens;

a location detection circuit, configured to dynamically detect a spatial location and an orientation for each of the multiple portable communication devices; and a multi-screen display controlling server, configured to operably establish a device group relationship among the multiple portable communication devices, to dynamically generate multiple partitioned videos respectively corresponding to multiple non-overlap image areas of a target video according to detection results of the location detection circuit, and to respectively transmit the multiple partitioned videos to the multiple portable communication devices;

wherein a relative position among the multiple image areas matches with a relative position among the multiple portable communication devices;

wherein the multi-screen display controlling server controls the multiple portable communication devices to respectively display the multiple partitioned videos on the multiple screens to jointly display at least a portion of a visible area of the target video;

wherein when a location or orientation of the first portable communication device changes, the multi-screen display controlling server dynamically generates an adjusted partitioned video according to a new location or orientation of the first portable communication device, and controls the first portable communication device to display the adjusted partitioned video on the first screen;

wherein while the multiple screens display the multiple partitioned videos, if the location of the first portable communication device is changed to change a distance between the first portable communication device and the location detection circuit, the first portable communication device generates a video scaling command; and wherein while the multiple screens display the multiple partitioned videos, if the multi-screen display controlling server received the video scaling command generated by the first portable communication device, the multi-screen display controlling server dynamically generates multiple adjusted partitioned videos respectively corresponding to the multiple image areas and controls the multiple portable communication devices to respectively display the multiple adjusted partitioned videos on the multiple screens to jointly present executing result of the video scaling command.

2. The video playback system of claim 1, wherein while the multiple screens display the multiple partitioned videos, if the multi-screen display controlling server received a first type control command generated by the first portable communication device, the multi-screen display controlling server transmits the first type control command to other portable communication devices of the multiple portable communication devices, and the multiple portable communication devices control displaying operations of the multiple screens according to the first type control command to jointly present executing result of the first type control command;

wherein the first type control command comprises a fast forward command, a fast backward command, or a pause command.

3. The video playback system of claim 1, wherein while the multiple screens display the multiple partitioned videos, if the first portable communication device received a first type control command inputted from a user, the first portable communication device transmits the first type control command to other portable communication devices of the multiple portable communication devices, and the multiple portable communication devices control displaying operations of the multiple screens according to the first type control command to jointly present executing result of the first type control command;

wherein the first type control command comprises a fast forward command, a fast backward command, or a pause command.

4. The video playback system of claim 1, wherein the multiple portable communication devices further comprise a second portable communication device, and the multiple screens further comprise a second screen arranged on the second portable communication device;

wherein the multi-screen display controlling server adds the first portable communication device and the second portable communication device to a same device group only if a distance between the first portable communication device and the second portable communication device is less than a threshold value.

5. The video playback system of claim 1, wherein the multiple portable communication devices further comprise a second portable communication device, and the multiple screens further comprise a second screen arranged on the second portable communication device;

wherein while the multiple screens display the multiple partitioned videos, if a location of the second portable communication device is changed to cause a distance between the first portable communication device and the second portable communication device to be greater than a threshold value, the multi-screen display controlling server controls the second portable communication device to stop displaying video.

6. The video playback system of claim 1, wherein the detection results of the location detection circuit are transmitted to the multi-screen display controlling server through at least one of the location detection circuit and the multiple portable communication devices.

7. The video playback system of claim 1, wherein a total area of the multiple image areas is less than a total area of the visible area of the target video.

8. The video playback system of claim 1, wherein a total area of the multiple screens is less than a total area of the visible area of the target video.

9. A computer program product, stored in a non-transitory storage device of a multi-screen display controlling server for jointly displaying video with multiple screens, when executed by a control circuit of the multi-screen display controlling server, enabling the multi-screen display controlling server to perform a multi-screen display controlling operation, the computer program product comprising:

a group setting module, configured to operably establish a device group relationship among multiple portable communication devices each comprising at least one of the multiple screens, wherein the multiple portable communication devices comprise a first portable communication device having a first screen, and the first screen is one of the multiple screens;

a receiving module, configured to dynamically receive detection results of a location detection circuit with respect to a spatial location and an orientation for each of the multiple portable communication devices;

a partitioned video providing module, configured to dynamically generate multiple partitioned videos respectively corresponding to multiple non-overlap image areas of a target video according to detection results of the location detection circuit, and to respectively transmit the multiple partitioned videos to the multiple portable communication devices; wherein a relative position among the multiple image areas matches with a relative position among the multiple portable communication devices; and a displaying control module, configured to operably control the multiple portable communication devices to respectively display the multiple partitioned videos on the multiple screens to jointly display at least a portion of a visible area of the target video;

wherein when a location or orientation of the first portable communication device changes, the partitioned video providing module dynamically generates an adjusted partitioned video according to a new location or orientation of the first portable communication device, and the displaying control module controls the first portable communication device to display the adjusted partitioned video on the first screen;

wherein while the multiple screens display the multiple partitioned videos, if the location of the first portable communication device is changed to change a distance between the first portable communication device and the location detection circuit, the receiving module receives a video scaling command generated by the first portable communication device; and wherein while the multiple screens display the multiple partitioned videos, if the receiving module received the video scaling command generated by the first portable communication device, the partitioned video providing module dynamically generates multiple adjusted partitioned videos respectively corresponding to the multiple image areas, and displaying control module controls the multiple portable communication devices to respectively display the multiple adjusted partitioned videos on the multiple screens to jointly present executing result of the video scaling command.

10. The computer program product of claim 9, wherein while the multiple screens display the multiple partitioned videos, if the receiving module received a first type control command generated by the first portable communication device, the displaying control module transmits the first type control command to other portable communication devices of the multiple portable communication devices, and the multiple portable communication devices control displaying operations of the multiple screens according to the first type control command to jointly present executing result of the first type control command;

wherein the first type control command comprises a fast forward command, a fast backward command, or a pause command.

11. The computer program product of claim 9, wherein the multiple portable communication devices further comprise a second portable communication device, and the multiple screens further comprise a second screen arranged on the second portable communication device;

wherein the group setting module adds the first portable communication device and the second portable communication device to a same device group only if a distance between the first portable communication device and the second portable communication device is less than a threshold value.

12. The computer program product of claim 9, wherein the multiple portable communication devices further comprise a second portable communication device, and the multiple screens further comprise a second screen arranged on the second portable communication device;

wherein while the multiple screens display the multiple partitioned videos, if a location of the second portable communication device is changed to cause a distance between the first portable communication device and the second portable communication device to be greater than a threshold value, the displaying control module controls the second portable communication device to stop displaying video.

13. The computer program product of claim 9, wherein the receiving module receives the detection results of the location detection circuit through at least one of the location detection circuit and the multiple portable communication devices.

14. The computer program product of claim 9, wherein a total area of the multiple image areas is less than a total area of the visible area of the target video.

15. The computer program product of claim 14, further comprising:

a video area partitioning module, configured to operably define the multiple non-overlap image areas in the visible area of the target video according to the detection results of the location detection circuit, so that the relative position among the multiple image areas matches with the relative position among the multiple portable communication devices.

16. The computer program product of claim 9, wherein a total area of the multiple screens is less than a total area of the visible area of the target video.

* * * * *